United States Patent [19]

Hauck

[11] 4,089,524

[45] May 16, 1978

[54] DIGITALLY CONTROLLED ELECTRONIC GAME

[75] Inventor: Lane T. Hauck, San Diego, Calif.

[73] Assignee: Gremlin Industries, Inc., San Diego, Calif.

[21] Appl. No.: 760,470

[22] Filed: Jan. 18, 1977

[51] Int. Cl.² .......................... A63F 9/14; G06F 3/14; G06K 15/20
[52] U.S. Cl. .......................... 273/85 G; 273/DIG. 28; 340/324 AD
[58] Field of Search ................. 273/1 E, 85 R, 130 R, 273/130 AB, 131 A, DIG. 28, 8 R; 340/323 R, 324 AD; 445/172.5; 364/200, 900

[56] References Cited

U.S. PATENT DOCUMENTS

| | | | |
|---|---|---|---|
| 3,404,890 | 10/1968 | Christy | 273/130 R |
| 3,665,410 | 5/1972 | Holland | 364/200 |
| 3,685,039 | 8/1972 | Flanagan | 340/324 AD |
| 3,778,058 | 12/1973 | Rausch | 273/85 R |
| 3,874,669 | 4/1975 | Ariano et al. | 273/85 R |
| 4,026,555 | 5/1977 | Kirschner et al. | 273/85 R |

OTHER PUBLICATIONS

Popular Electronics; "Build Pontronics"; Apr. 1976; pp. 35-45.
Popular Electronics; "Add Scoring & Sound Effects to Last Month's Pongtronics"; May, 1976; pp. 61-65.
Popular Electronics; "Build the TV Dazzler"; Feb., 1976; pp. 31, 37-40.
Popular Electronics; "Altair 8800"; Jan., 1975; pp. 33-38.
Martin Gardner's New Mathematical Diversions from Scientific American; Gardner, M.; 1966; pp. 210-217.
The Way to Play; "Hex"; 1975; p. 57.
Rado-Electronics; "Build This Great TV Game"; Jun., 1976; pp. 35-37, 79-81.
Electronics; "Games"; Jun., 1976; pp. 89-96.

Primary Examiner—Richard C. Pinkham
Assistant Examiner—Vance Y. Hum
Attorney, Agent, or Firm—Christie, Parker & Hale

[57] ABSTRACT

An electronic game in which each player controls his own moving image on a visual display to change the direction of movement of the image as it advanced on the display. As each player's image moves, changing direction on command, it forms a visual "barrier" trail on the display of the path traversed. This barrier trail cannot be crossed by the moving image of another player or a "crash" occurs. A crash of a player's moving image with a barrier trail, generated by movement of his own image or by any of the other player images, or with a fixed barrier surrounding the field of play, eliminates the player from the round. A winner of the game or round results when all but one player has been eliminated.

24 Claims, 24 Drawing Figures

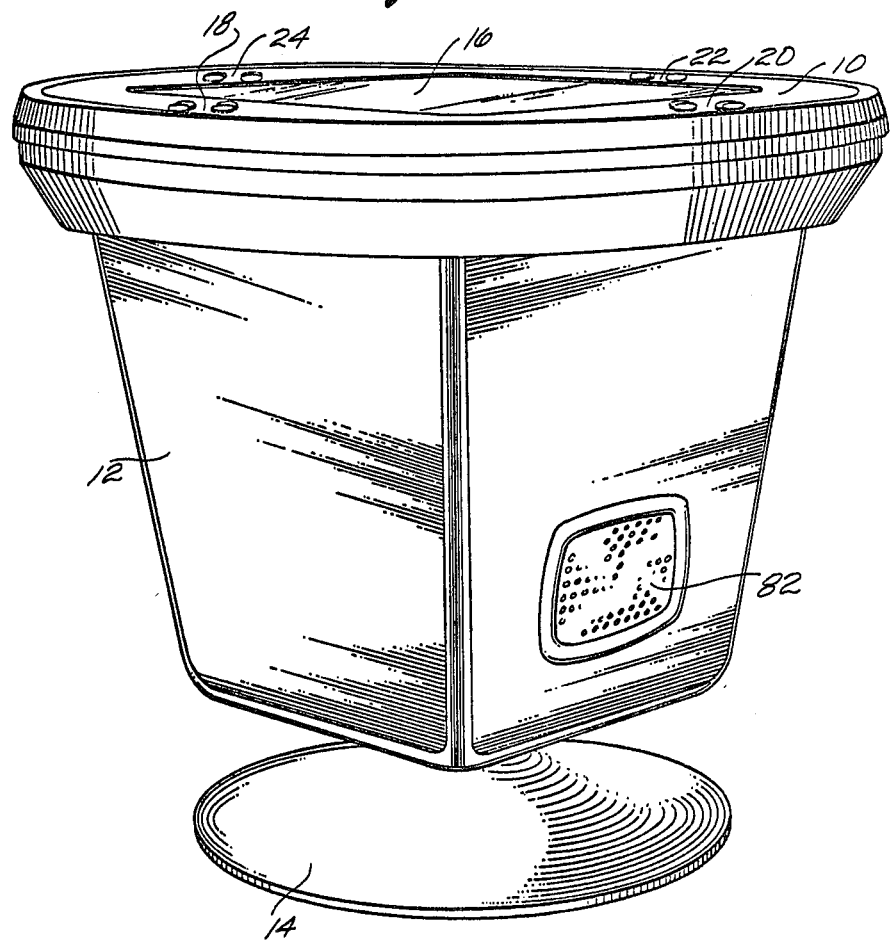
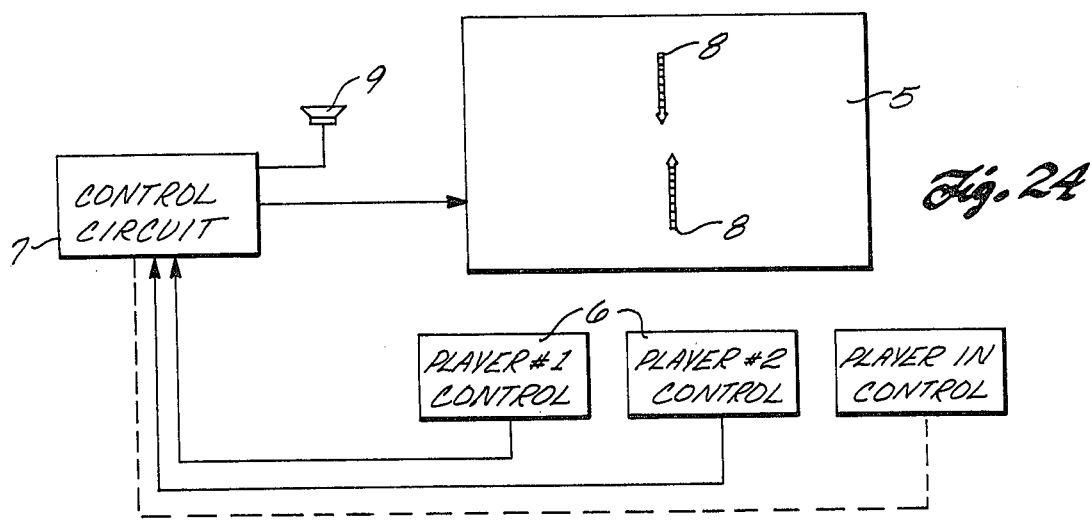

Fig. 13

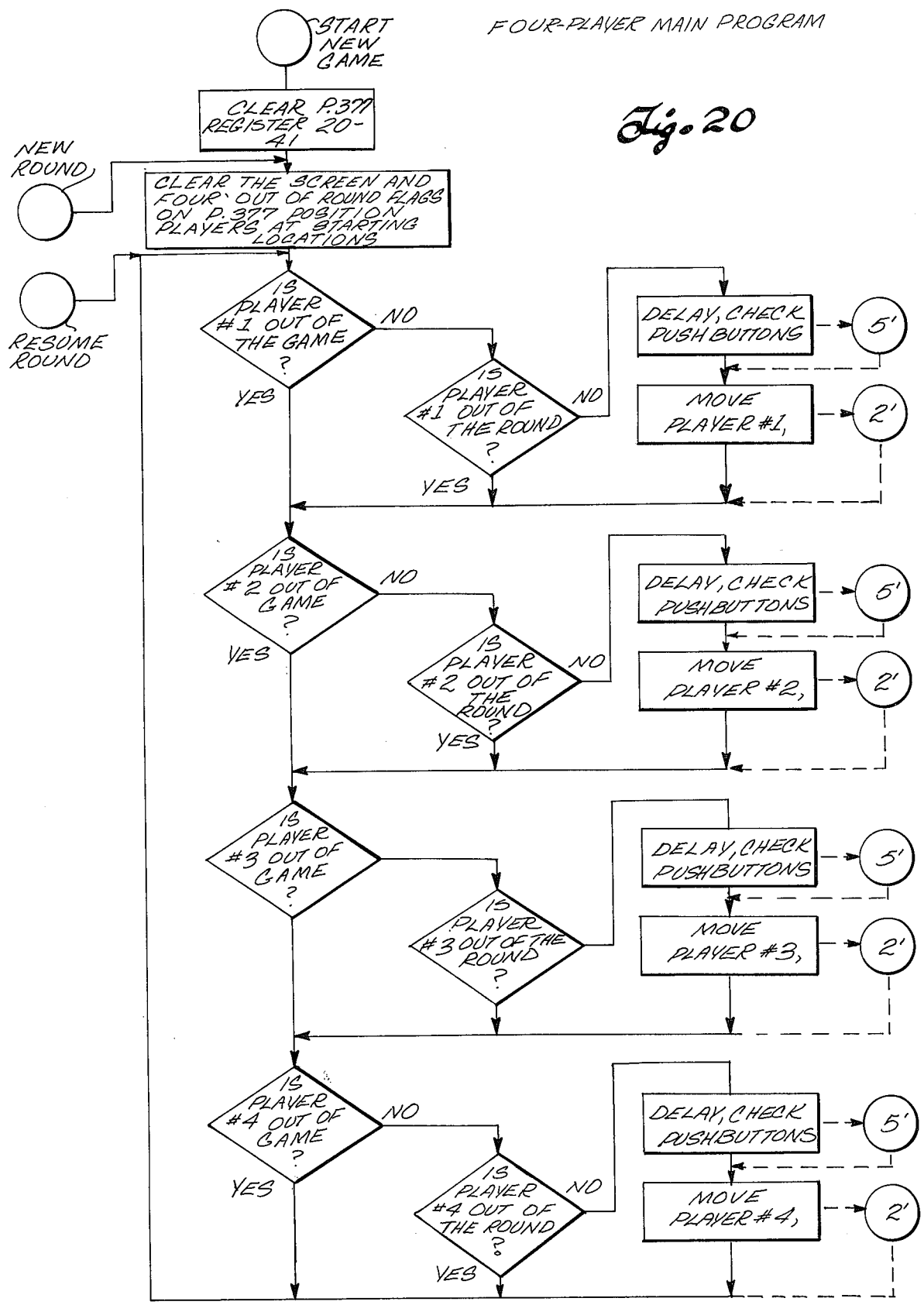

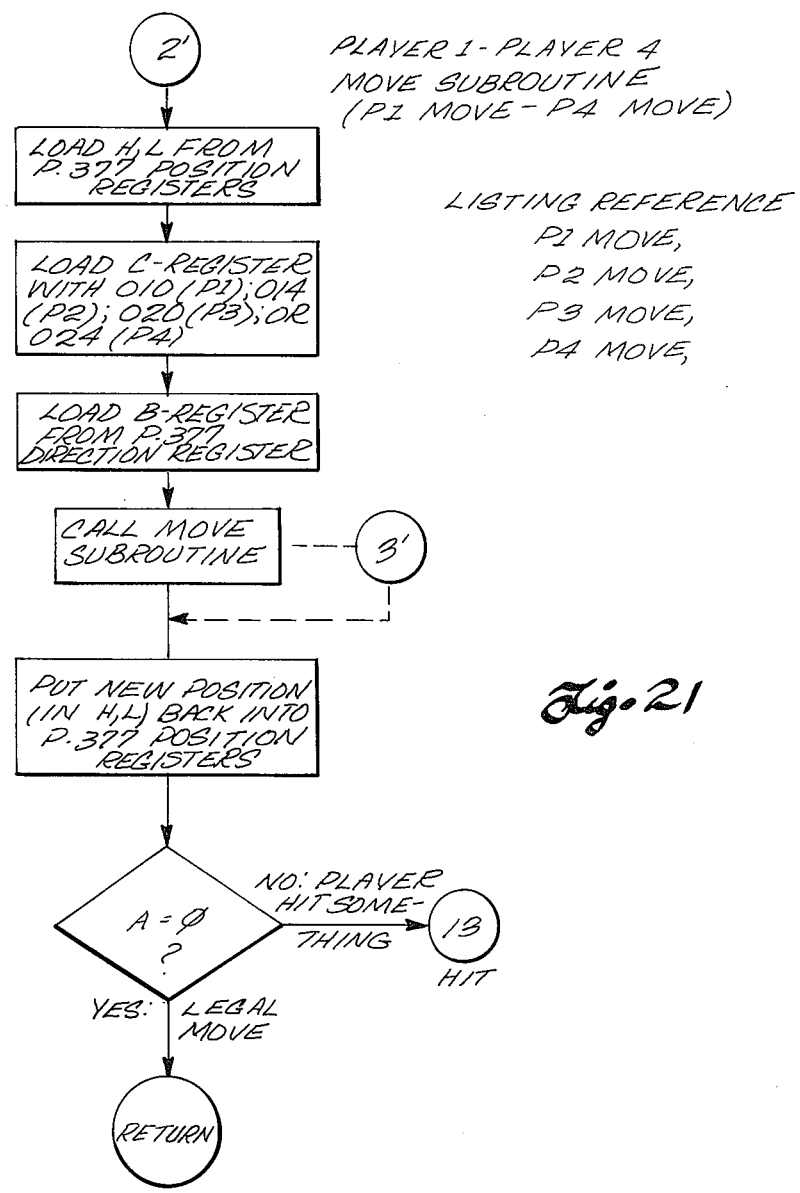

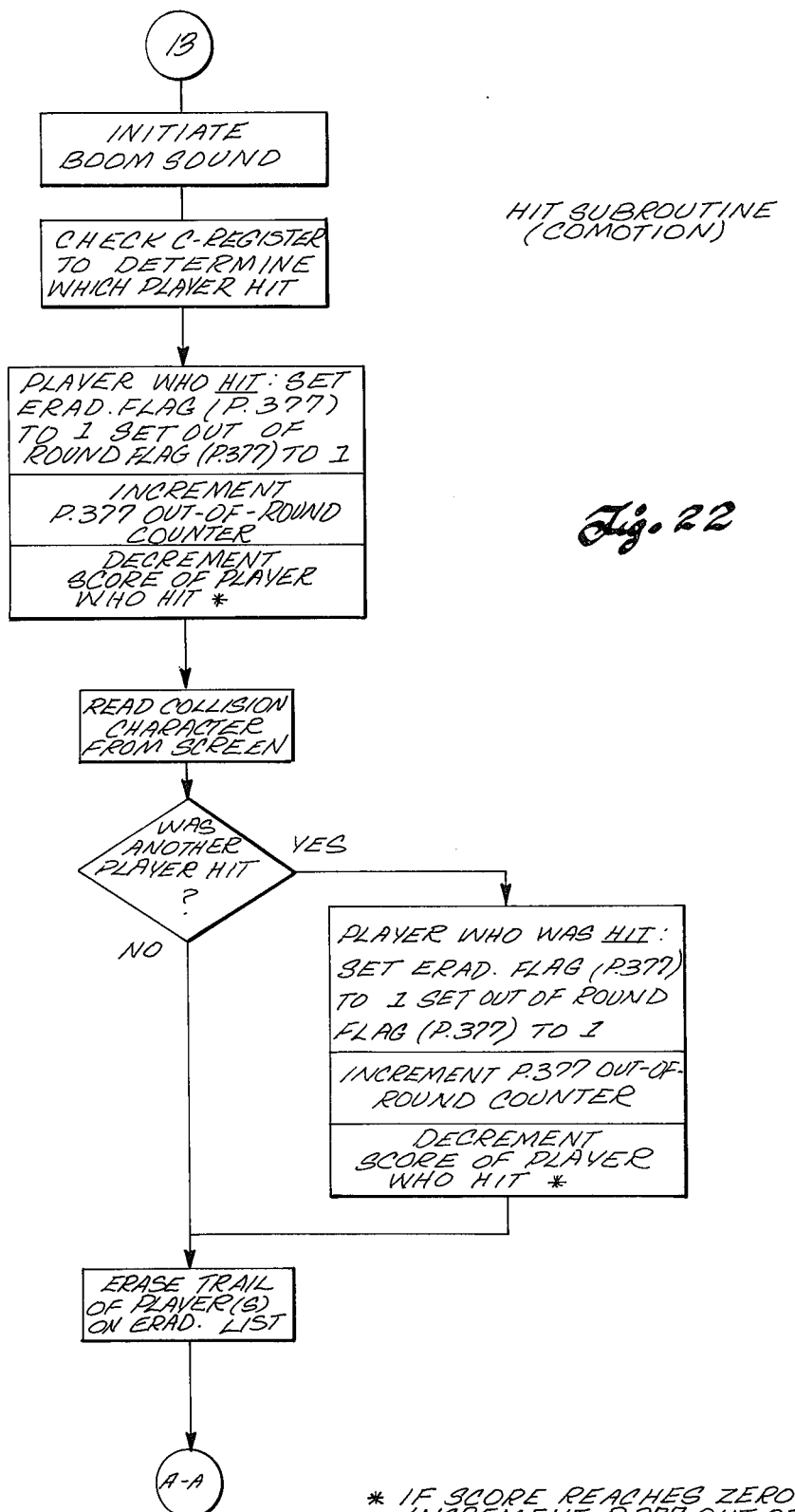

DIGITALLY CONTROLLED ELECTRONIC GAME

FIELD OF THE INVENTION

This invention relates to player operated, digitally controlled, electronic games and, more particularly, to a multiple player game utilizing a cathode ray tube display.

BACKGROUND OF THE INVENTION

Electronic games which utilize a cathode ray tube display, such as a home television receiver or the like, have become very popular. Particularly, such games simulate conventional games such as table tennis, hand ball, hockey or the like. The ball is simulated by a moving image on the CRT display. The path of the moving image is controlled by the apparent bouncing of the moving image off of visual barriers on the display which may be fixed or movable in position as controlled by the players. Games of this type are described, for example, in U.S. Pat. No. 3,659,284 and reissued U.S. Pat. No. 28,598.

SUMMARY OF THE INVENTION

This present invention is directed to an improved electronic game in which a plurality of moving visual images are generated on a display field, such as a CRT display. Each player, by means of a manually operated control, directs the movement of his image on the display. As each player image advances, a visual image of the path traversed remains on the display. The movement of a player controlled image is interrupted when the image intercepts the retained image of any of the paths traversed by the moving images on the display or intercepts a fixed barrier image surrounding the field of play.

In the preferred embodiment, each image moves in a straight line in incremental steps until the player signals that the direction should be changed. However, reversing the direction of movement by player causes his moving image to run into his own traversed path, thereby eliminating the player from further progress of the game.

Each incremental advance of a player's moving image is accompanied by a staccato sound which has a unique pitch for each direction of movement of the image. The range of pitch is different for each player. The incremental advances of multiple moving images are made in sequence and alternately and the staccato notes accompanying the incremental advances are therefore likewise in sequence. Control of the images on the cathode ray tube display is under the control of a digital microprocessor.

The game may be arranged as a game for only two players or as a game for a larger number of players, such as four players. In a two player game, a round terminates when either player has a collision. In a multiple player game, the round continues until all the players but one have had a collision. When a collision occurs with more than two players in the game, the player causing the collision is eliminated from the round but the images of the remaining players continue to move on the display. The image of the eliminated player is preferably removed from the display and no longer forms a barrier to movement of the remaining player images.

One feature of the invention involves a CRT display in which contiguous symbols can be visually displayed in a two-dimensional matrix. Data uniquely defining each symbol is stored in a read-write memory, the data address in the memory corresponding to a particular symbol location on the display matrix and the data defining the type of symbol to be displayed at that location. A data processor, by directly addressing the memory, can read out the data associated with each symbol being displayed and can update the data to a new symbol at any location in the display matrix.

DRAWINGS

For a better understanding of the invention, reference should be made to the accompanying drawings wherein:

FIG. 1 is a perspective view of a table top game installation;

FIG. 10 is a block diagram of the electronic control circuitry for the game;

Figure 10:
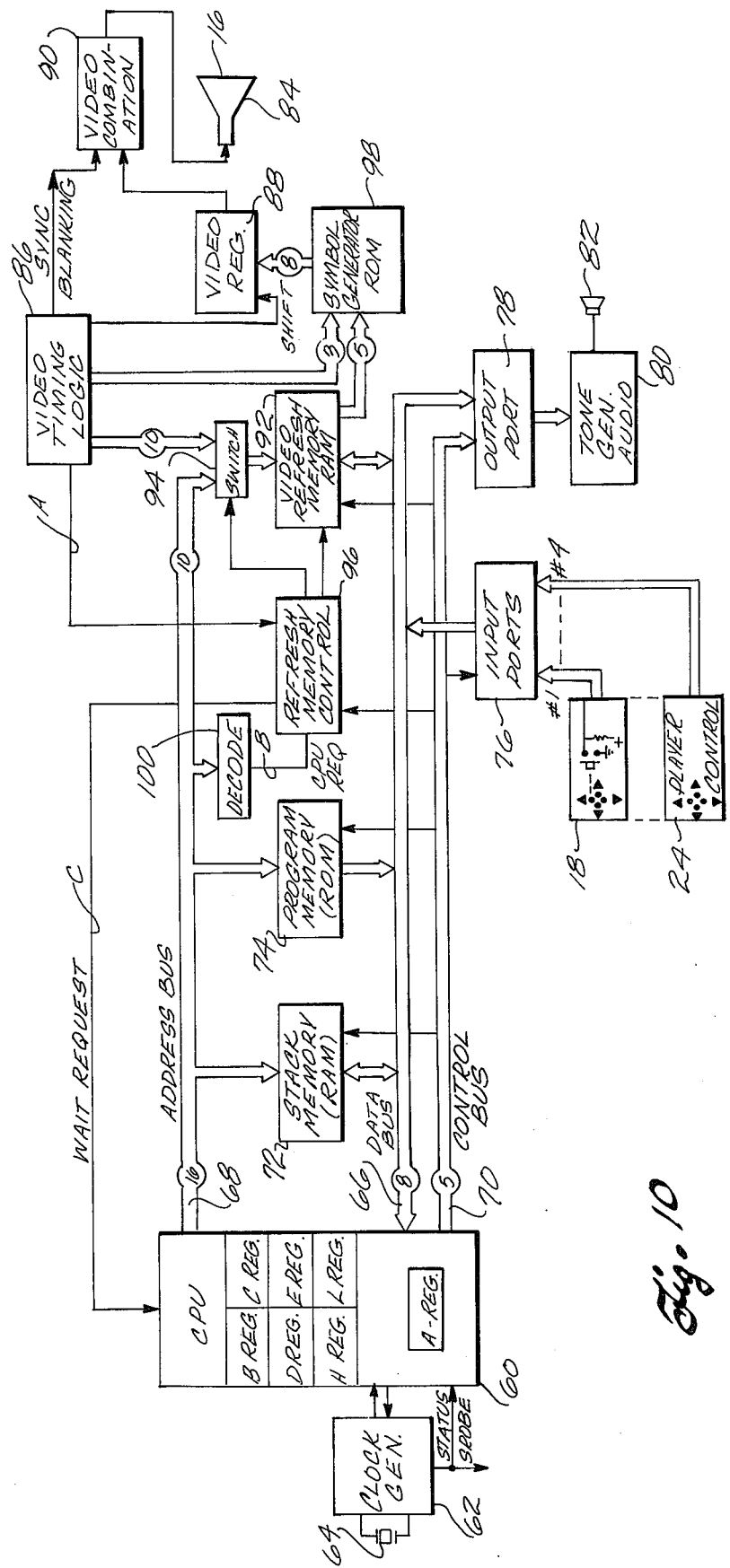
Figure 12:
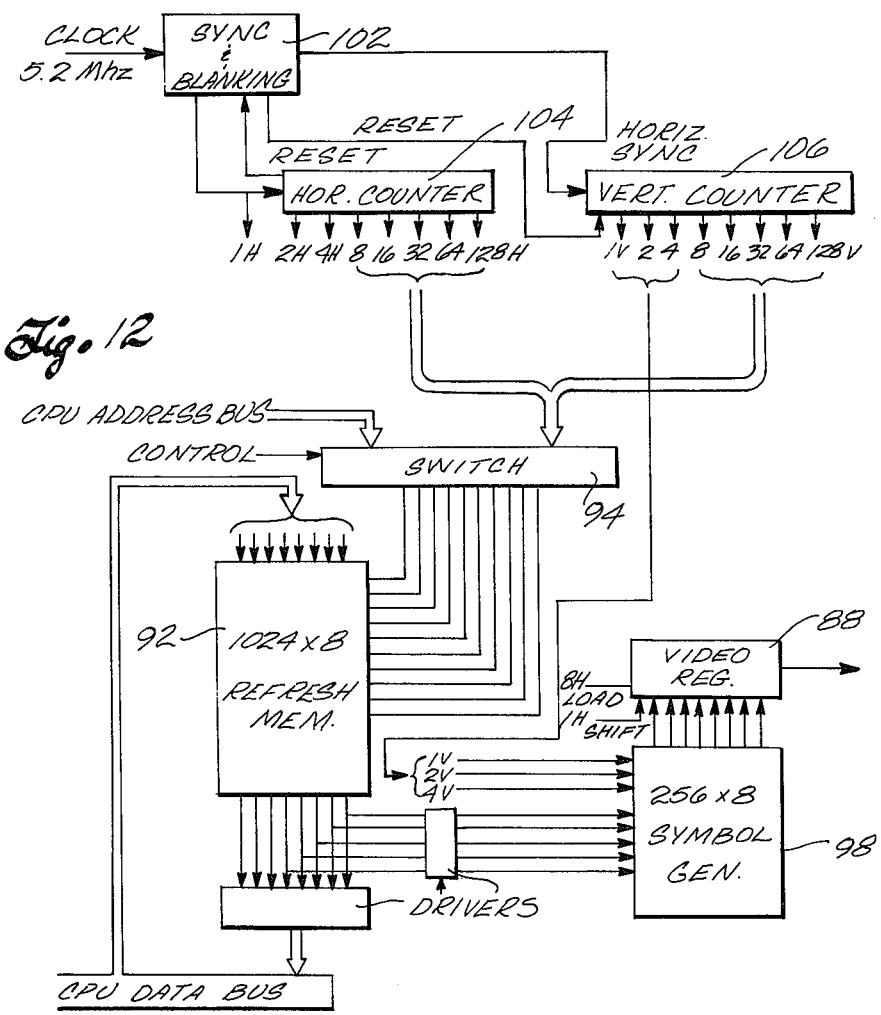

FIGS. 11A-D show a series of waveforms used for explaining the operation of the control circuit of FIG. 10;

FIG. 12 is a detailed block diagram of the CRT display control;

Figure 13:
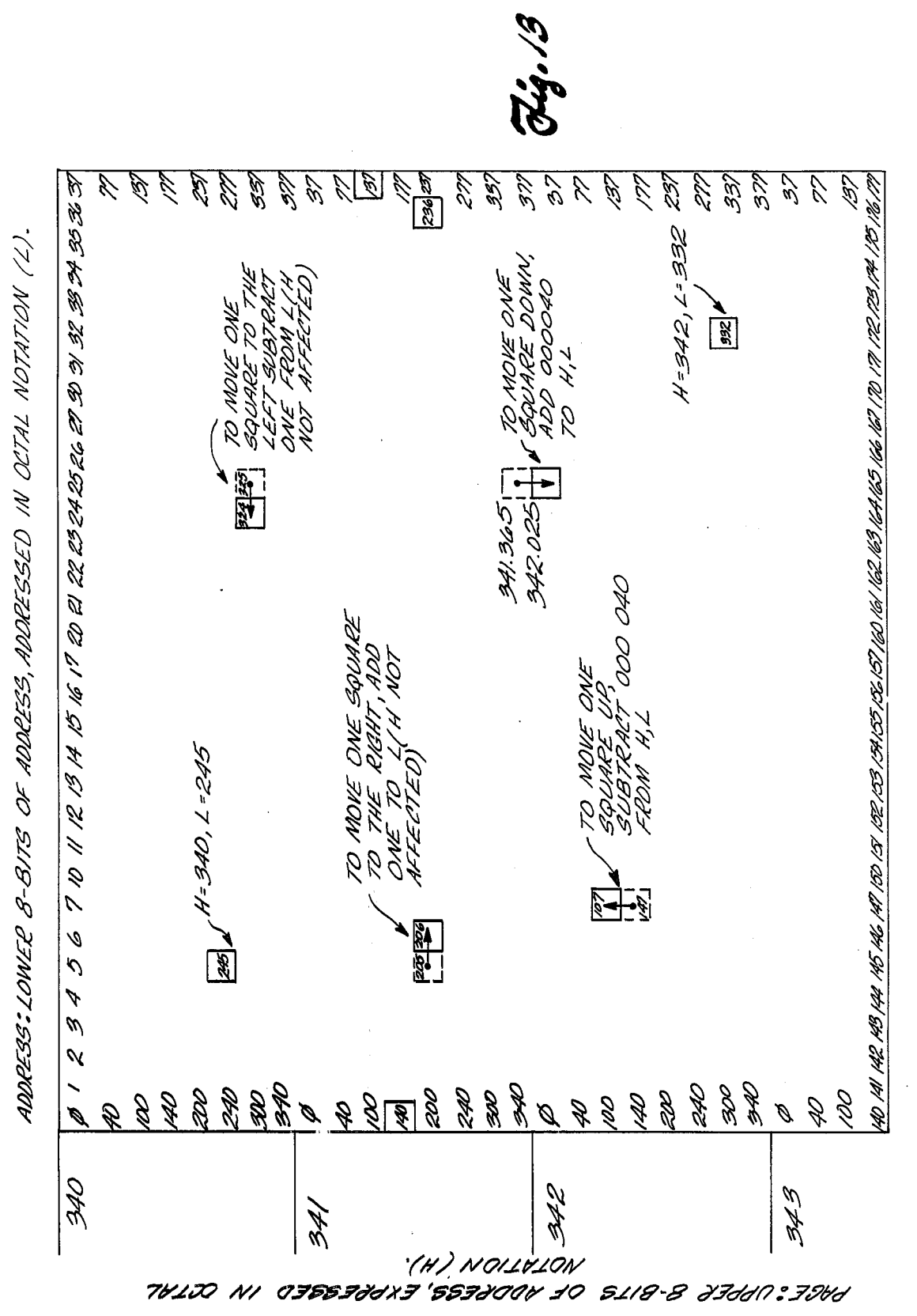

FIG. 13 is a map of the video refresh memory;

FIGS. 14–19 are a series of flow diagrams of the program for a two player game;

FIGS. 19–23 are a series of flow diagrams of the program for a four player game; and FIG. 24 is a generalized block diagram of the basic game components.

DETAILED DESCRIPTION

General Description of the Game

The basic concept of the invention can best be understood by reference to FIG. 24. The game consists of a visual display unit 5 which is preferably a television monitor or similar cathode ray tube device by which visual images can be created. Each player is provided with his own manual control unit 6 by which he controls movement of his own player image on the display unit 5 by means of a control circuit 7. The control circuit 7, in a manner hereinafter described in detail, causes player images (preferably in the form of arrowheads) to advance from starting positions, such as indicated at 8, along predetermined paths, leaving a visual trail on the display of the complete paths traversed by the player images from the starting position 8. Each player, by means of his own control 6, can at any time alter the direction in which his player image is advanced by the control circuit. The object of the game is to control each player image so that it does not intercept the paths traversed by any of the player images during the course of a game. If a player, by failing to effectively alter the direction in which his player image advances, allows his player image to intercept either his own trail or one of the player trails on the display, a "collision" occurs. This may be signalled by an audio alarm, for example, using a speaker 9. In two-player games, a collision terminates a round and a new round is commenced. If the game involves more than two players, the game continues, after delay, with continued movement of the images of the players remaining in the round, the colliding player being eliminated from the round and preferably, his image and trail being erased from the display.

While the physical arrangement of the player controls and display may take a variety of forms, one example of embodiment for four players is shown in FIG. 1. As shown, the game is incorporated in a pedestal table having a flat table top 10 supported by a pedestal 12 from a base 14. In the center of the table is a screen 16 of a vertically mounted cathode ray tube display. Four player positions are provided around the table, each player positioned being provided with a set of four push-button switches, indicated generally at 18, 20, 22 and 24. These push-buttons are used by each player to control images displayed on the screen 16 in a manner hereinafter described in detail. While four player positions are shown, the game can be played by two players at opposing positions, by three players, or by four players. An alternative game having only two player positions also may be provided.

Figure 2:
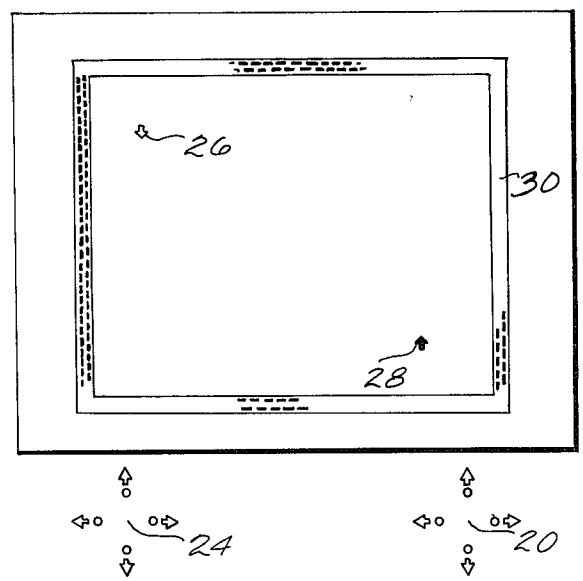
FIG. 2 shows the display at the start of a game in which two players participate.

Referring to FIG. 2, the image displayed on the screen 16 at the start of a two-player game is shown. Let it be assumed that Player #1 is in position to operate the set of push-buttons 24 and Player #2 is in position to operate the set of push-buttons 20. By means of the set of four push-buttons, each player is able to control the direction of movement of a player image, for example, the player image may be in the form of a symbol such as an arrow pointing in the current direction of movement on the screen. Thus Player #1 controls an arrow 26 initially positioned near the upper left corner of the screen as viewed in FIG. 2, while Player #2 controls an arrow 28 initially positioned near the lower right hand corner of the display. The field of movement is surrounded by a rectangular boundary represented by the visual border 30 displayed on the screen 16. The boundary 30 is formed from individual display symbols resembling bricks that are lined up in an end-to-end configuration both vertically and horizontally, plus separate corner symbols at each of the four corners of the boundary. The manner in which the individual symbols or characters appearing on the screen are generated is described below.

Once the game has started, the respective arrows advance alternately in incremental steps in the direction indicated by the arrows. Following each incremental step, the player can change the direction of his arrow by pressing appropriate ones of the set of buttons available to him. Thus each player's arrow can be pointed in any selected one of four mutually perpendicular directions. Each time the arrow moves an incremental space on the screen, its former position is occupied by one of the brick symbols. As the arrow of each player moves across the face of the screen, it leaves behind a visual trail in the form of a barrier image similar to the image forming the boundaries 30. Thus as the game progresses and the players change the directions in which their arrows point, a maze-like picture is produced on the screen formed by the barrier images laid down along the paths of movement of the respective arrow.

Figure 3:
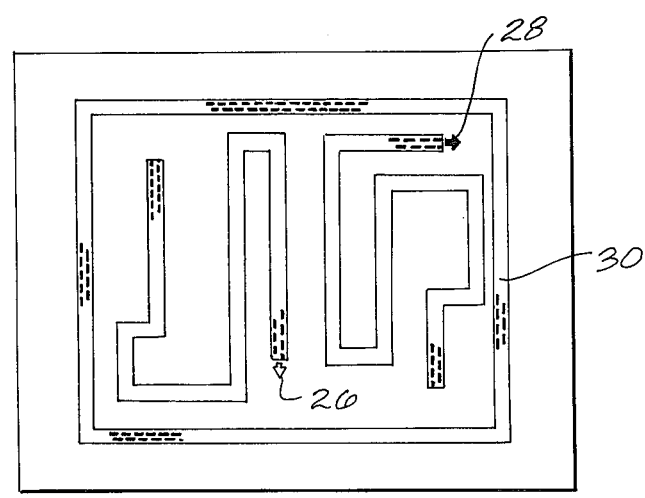
FIGS. 3–6 illustrate the display with different game situations in a two player game.

FIG. 3 shows the condition of the display on the screen 16 after a typical game has progressed through a series of moves. As shown in FIG. 3, the arrow 26 has progressed through six changes in direction and has laid down a barrier formed of alternate series of vertical bricks and horizontal brick symbols joined by corner symbols wherever the arrow has changed direction during the course of its movement. Similarly the arrow 28 as shown in FIG. 3 has progressed through seven changes in direction and has left a barrier trail formed of vertical and horizontal brick symbols joined by corner symbols which appear as a continuous image extending between the starting point and the current position of the arrow symbol. The arrows continue to advance in incremental steps, changing direction as controlled by the player through his set of push-buttons.

Figure 4:
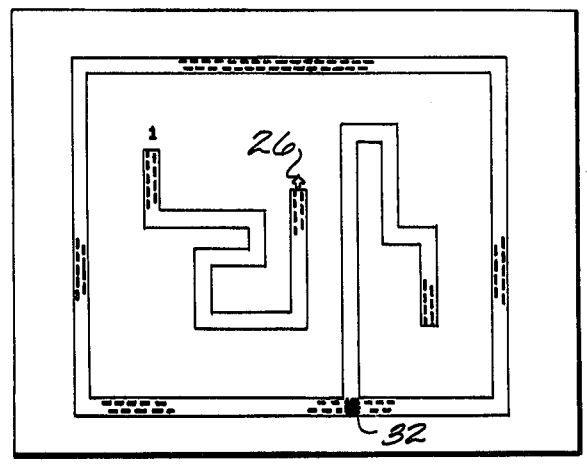
Figure 5:
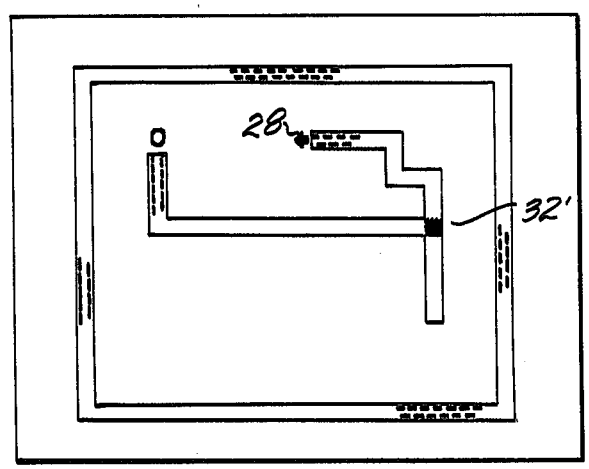
Figure 6:
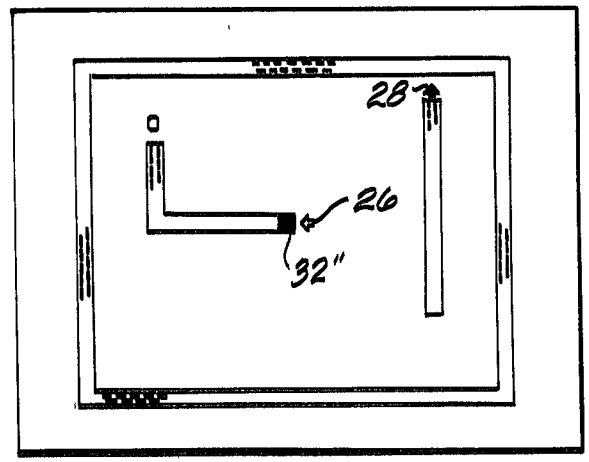

The game progresses until one of the two players has moved into one of the barriers established by the boundary 30 or the barrier trails behind the arrows or if the arrows attempt to occupy the same location. This condition, referred to as a crash, is signaled by a flashing symbol on the display at the point of collision accompanied by an audible explosion sound. Three possible collision conditions are illustrated in FIGS. 4, 5 and 6. In FIG. 4 arrow 28 of Player #2 has moved into a collision with the lower boundary, as indicated by the collision symbol at 32. This scores a point for Player #1 as indicated by the symbol 1 appearing adjacent the starting location of the first player. FIG. 5 illustrates a collision between the arrow 26 of the Player #1 and the barrier trail of Player #2, as indicated at 32'. FIG. 6 illustrates a collision condition where the arrow 26 of Player #1 has reversed its direction and therefore moved into collision with the player's own barrier trail, as indicated by the collision symbol at 32'.

It should be noted that a player's arrow continues to move in the direction which it points until one of the other buttons is momentarily operated, at which time the arrow takes the corresponding change in directions and continues in that direction during successive moves until another button is touched. Thus at any point in time, a player can operate one button which makes no change in the direction, can operate either of two other buttons which cause the arrow to turn to the right or to the left, or can push a fourth button which results in a reversal of direction and a crash with the player's own barrier trail. The arrows advance alternately at a fixed rate of approximately two incremental moves per second per player. A new direction can only be selected between each move, thereby testing the player's reaction time in anticipating a change in direction to avoid a collision.

To add further interest to the game, as each player's arrow makes its incremental move, a staccato note is sounded. Each direction of movement has a characteristic pitch. Thus, as each player's arrow moves, a note is generated having a characteristic pitch depending on which of the four directions the arrow has moved. Moreover, the notes produced with movement of the respective players have distinctive pitches. Thus two notes are repeatedly and alternately sounded as the two arrows move in step-wise fashion across the screen, the two notes being distinguished from each other by their pitch and also audibly indicating the direction of movement by their respective pitches.

After each crash the score of both players is displayed on the screen for a brief interval while the final pattern for the game is left on the screen. The screen is then cleared of all barrier trails and is returned to its initial playing position illustrated in FIG. 2 so that another round can be commenced.

Figure 7:
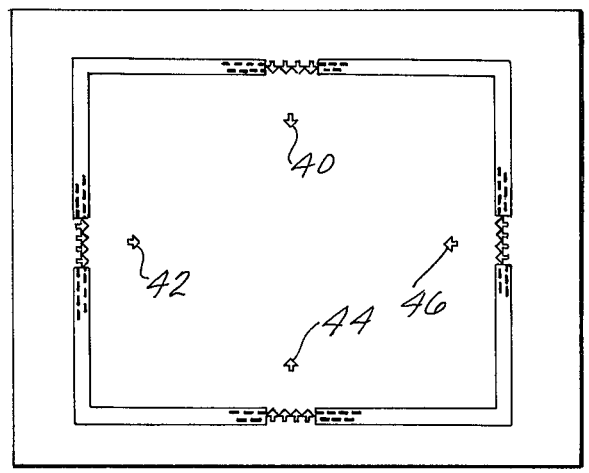
FIG. 7 shows the initial display of a four player game.

In an alternative version of the same game, four players may participate using the four sets of push-buttons shown in FIG. 1. The initial display at the start of the game is shown in FIG. 7. Again the game is provided with an outer rectangular boundary 30 and with the image of the arrow symbol for each of the players displayed adjacent the center of the four-sided boundary, as indicated at 40, 42, 44 and 46, each of the arrows being pointed towards the center. However, the opposing arrows are offset one position from each other so that they do not lie on a collision course as they progress towards each other across the face of the screen. Again each player controls the direction in which the arrow symbol advances by manipulating the set for four buttons in the manner described above. Again, a collision takes place whenever the arrow of any player moves into one of the barriers formed by the boundary or the trails left by any of the four players.

Figure 8:
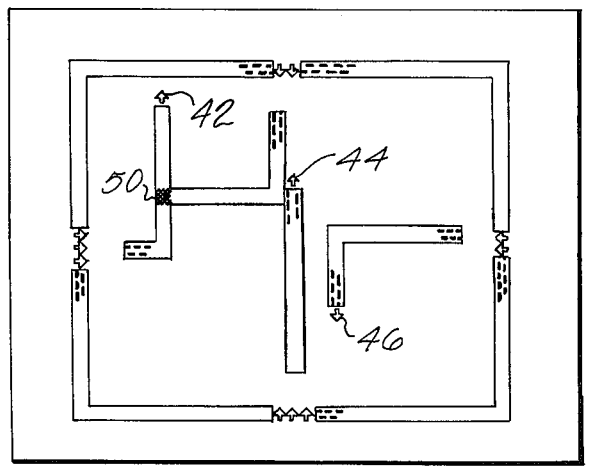
Figure 9:
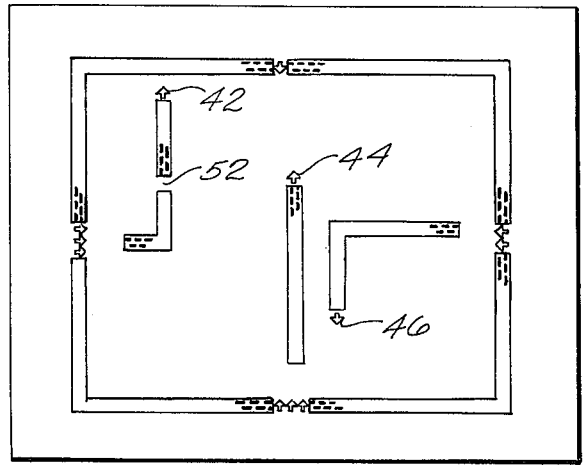
FIGS. 9, 10 and 11 show various display configurations during the progress of a game with four players.

FIG. 8 shows, for example, a collision between the arrow 40 and the barrier trail left by movement of the arrow 42, as indicated by the collision symbol at 50. After the crash, as shown in FIG. 9, the barrier trail left by the movement of arrow 40 is removed from the screen and a hole is left in the barrier trail left by the arrow 42 at the point of collision, as indicated at 52. It is possible for the arrow of one of the other players to move through this hole in the trail barrier without producing a collision. The game continues until all but one of the players has collided with one of the barriers. The score is maintained by a set of arrows positioned in the outer boundary 30 opposite the starting point of each of the players. Whenever a player experiences a collision, the number of arrows is reduced by one. A winner is declared when all but one of the players has lost all four scoring arrows. It will be noted that in comparing FIGS. 8 and 9 that the number of scoring arrows associated with the player controlled arrow symbol 40 was reduced from 2 to 1 as the result of the collision at 50.

The generation and movement of the images formed on the screen 16 in conformance with the rules of the game and under the manipulation of the players through the sets of push-buttons is under the control of an electronic circuit which is shown in schematic block form in FIG. 10. The heart of the control circuit is a central processing unit (CPU) 60, which is preferably a microprocesser such as the Intel 8080 central processing unit described in detail in the publication "8080 Microcomputer Systems Users' Manual" published September 1975 by Intel Corporation. However, any general purpose central processing unit could be used in this system. The CPU 60 is under the control of a clock generator 62 whose frequency is controlled by a crystal 64. The frequency is selected so that the clock circuit provides the basic frequencies required for both the microprocessing system and the USA standard video raster scan control of the cathode ray tube display. The CPU, in addition to the arithmetic unit with its accummulator or A-register, has six 8-bit general purpose registers arranged in pairs, referred to as B, C; C, E; and H, L which can be used as single 8-bit registers or as 16 bit register pairs. Data is transferred to or from the registers in the CPU over an 8-bit bi-directional data bus 66. Registers H and L are used for storing address information and communicate with a 16-bit address bus 68. In addition, the CPU system provides five output control signals on a control bus 70. Only four of these control arms are of interest, an I/O Read, an I/O Write, a Memory Read, and a Memory Write which control transfer among the CPU, various memories and I/O devices in the system in known manner.

The address bus transfers addresses to the read-write or random access memory (RAM) 72 to select address locations in the memory to which or from which data is transferred from or to the selected registers in the CPU over the data bus 66. The memory 72 is also used by the CPU as a first-in last-out memory or stack, to perform subroutine calls and returns. The memory 72 is also used as a temporary data storage during execution of programs. The address bus 68 also addresses a read-only memory (ROM) 74 which is used to store program instructions and program constants that are transferred to an instruction register (not shown) in the CPU over the data bus 66 in controlled sequence.

The data bus 66 communicates with one or more input ports 76 and output ports 78. The input ports receive signals in response to the operation of the respective sets of push-buttons 18, 20, 22 and 24. The output port communicates with a tone generator 80 which generates tones associated with the play of the game by means of a loud speaker 82. The system as thus far described, including the clock generator 62, CPU 60, RAM memory 72, ROM memory 74 and the input and output ports 76 and 78 comprises a conventional microcomputer system such as described in detail in the above identified 8080 Users Manual. The manner in which the microcomputer system controls the operation of the game will be described in detail after the rest of the CRT control circuit has been described.

The remaining elements of the circuit of FIG. 10 provide a video control system for a cathode ray tube monitor for converting information generated by the processing system into the desired format displayed on the cathode ray tube screen 16. The cathode ray tube is part of a conventional television monitor indicated generally at 84 which utilizes a standard 525 line raster scanning system. Sync and blanking signals for controlling the raster scan are derived from a video timing logic circuit 86. These signals are combined with a video signal derived from a video shift register 88, the video signal and sync and blanking signal being combined in a combiner circuit 90 and applied to the input to the monitor 84 to produce the desired visual display.

The visual display, as pointed out above, consists of a plurality of symbols or characters which are arranged and positioned on the face of the tube to provide various patterns such as shown in FIGS. 2 through 9. While the number of different types of symbols or characters capable of being displayed may be varied according to the specific design of the system, the preferred embodiment utilizes 32 different symbols each of which occupies the same size square area when displayed on the screen. The display area is confined to a matrix of 32 contiguous symbols in width and 28 contiguous symbols in height. In other words, any one of 32 different symbols can be displayed on the screen at any one of 896 contiguous locations arranged in a 32 × 28 matrix. Sixteen symbols or characters and their octal code are shown in the following table:

TABLE I

| OCTAL CODE | | | | | |
|---|---|---|---|---|---|
| G | $P_1$ | $P_2$ | $P_3$ | $P_4$ | SYMBOL |
| 000 | 040 | 100 | 140 | 200 | ⌐ |
| 001 | 041 | 101 | 141 | 201 | ⌐ |
| 002 | 042 | 102 | 142 | 202 | ⌐ |

TABLE I-continued

| G | OCTAL CODE P_1 | P_2 | P_3 | P_4 | SYMBOL | |
|---|---|---|---|---|---|---|
| 003 | 043 | 103 | 143 | 203 | ⌐ | |
| 004 | 044 | 104 | 144 | 204 | ▫ | |
| 005 | 045 | 105 | 145 | 205 | ▯ | |
| 006 | 046 | 106 | 146 | 206 | BLANK | |
| 007 | 047 | 107 | 147 | 207 | CRASH | |
| 010 | 050 | 110 | 150 | 210 | ↑ | Used for all four players in four-player game; and to only one player in two player game |
| 011 | 051 | 111 | 151 | 211 | → | |
| 012 | 052 | 112 | 152 | 212 | ↓ | |
| 013 | 053 | 113 | 153 | 213 | ← | |
| 014 | 054 | 114 | 154 | 214 | ⇑ | Only used in two player game for second player |
| 015 | 055 | 115 | 155 | 215 | ⇒ | |
| 016 | 056 | 116 | 156 | 216 | ⇓ | |
| 017 | 057 | 117 | 157 | 217 | ⇐ | |
| 020 ... 037 | | | | | used for alphanumeric characters. | |

The remaining sixteen symbols may be alphanumeric characters or the like for displaying messages on the screen, if desired. By definition, each of the 32 symbols requires eight scan lines in height and eight dots per line in width. The pattern of eight dots is controlled by eight binary bits stored in a video register 88. The video timing logic 86 shifts the eight bits out of the video register 88 to the video combiner 90 at a rate synchronized with the line scan rate to generate the pattern of dots within the horizontal scan line distance on the screen allotted to one symbol. A complete line scan generates a pattern of eight dots for each of the 32 symbol positions across the width of the display for a total of 256 dots per horizontal line. Eight line scans are required to complete each row of symbols on the display screen. This requires that the video shift register 88 be loaded 8 × 32 times and shifted out serially eight bits at a time to reproduce one complete row of 32 symbols on the screen. This process is repeated twenty-eight times during one vertical scan to generate the full matrix of symbols on the screen.

Information as to which of the 32 symbols is to be displayed in each of the symbol positions of the 32 × 28 matrix on the display screen is stored in a Video Refresh memory 92, which is a random access memory (RAM) having 1024 addressable eight-bit word locations. The Video Refresh memory stores information received from the CPU over the data bus 66 and is addressed by the CPU over the address bus 68. Thus the Refresh memory 92 is treated in the system as a general addressable memory having a unique address space in the addressing range of the CPU.

Information can also be read out of the Video Refresh memory 92 for purposes of CRT display by addresses derived from the video timing logic 86. A multiplexing switch 94 is under the control of a refresh memory control circuit 96. The refresh memory control 96, as explained hereafter in more detail, permits the CPU to address the Refresh memory 92 only during the vertical retrace (or vertical blanking interval) of the cathode ray tube monitor. During the raster scan interval, the Refresh memory 92 is addressed by the video timing logic 86 so as to read out the information stored in the memory at the appropriate times to continuously load the video shift register 88 with the necessary information to generate the symbol display on the screen 16.

Each 8-bit word in the Refresh memory stores five binary bits which are coded to designate one of the 32 symbols, as per the column marked G in Table I. The remaining three bits may be used to store information regarding such things as which player, if any, is associated with a particular symbol, as included by column $P_1$, $P_2$, $P_3$, and $P_4$ of Table I. These additional three bits could also be used to provide appropriate color information if it was desired to use a color monitor. It should be noted that while the Refresh memory 92 has a capacity of 1024 words only 896 words are stored in the memory, one word for each symbol location in the 32 × 28 symbol matrix of the display.

The five bits identifying a particular symbol, when read out of the refresh memory 92 are applied to a symbol generator 98, which is a read-only memory (ROM) storing 256 eight-bit words. These words are divded into thirty-two groups of eight words per group, each group corresponding to the sixty-four bits (8 × 8) required to generate one of the thirty-two symbols. The five bits received from the Refresh memory 72 address a selected one of the thirty-two groups. The eight words in each group are individually addressed by three additional bits derived from the video timing logic 86, which bits identify which of the eight lines of a symbol is currently being scanned across the monitor display screen. The 8-bit words stored in the symbol generator 98, as they are addressed, transferred out in parallel to the video shift register 88. The eight-bits are then shifted out of the video register 88, serially to modulate the cathode ray beam to form the desired pattern of eight dots of one line of the selected symbol. Because the video signal is binary in form, each dot will be either dark or light on the screen.

Figure 11:
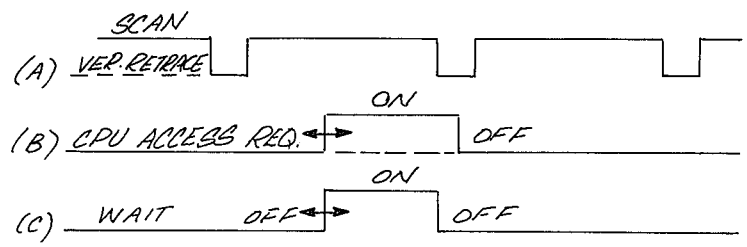

The operation of the refresh memory control 96 can best be understood by reference to the timing diagrams of FIG. 11A-C. The video timing logic 86, in generating the sync and blanking signals for the monitor 84, provides a binary signal having the wave form shown in FIG. 11A which changes states between a SCAN level and a Vertical Retrace level. Whenever the CPU addresses one of the memories, it provides a sixteen bit address on bus 16. In addressing the Video Refresh memory 92 ten of those bits are used to designate a word location in the memory and the remaining six bits are applied to a decode circuit 100 which provides an output that indicates a CPU access request of the video Refresh memory 92, as shown by the wave form in FIG. 11B, this request may come at any time in relation to the video scan cycle, as indicated. Since the CPU can be given to the memory 92 only during the vertical retrace time, the refresh memory control 96, in response to the CPU access request, generates a WAIT signal, shown in FIG. 11C. The WAIT signal goes true whenever the CPU access request goes on and the monitor is doing a SCAN. When the monitor goes into vertical retrace, the WAIT signal is turned off and the Refresh Memory control 96 allows the CPU to access the memory. This signal remains on until the CPU access request goes off. The WAIT signal of FIG. 11C is applied to the CPU 60 and operates to suspend operation of the CPU until access to the Refresh memory 92 is granted. The fact that the CPU operation may be temporarily suspended until the access request can be granted utilizes a standard technique where the CPU is used with relatively slow memories, as described in more detail in the above identified 8080 Users' Manual.

The operation of the video timing logic in addressing the Video Refresh memory 92 and the symbol generator 98, and in controlling the timing of the video shift register 88 is shown in more detail in FIG. 12. The standard video monitor requires that it be supplied with a horizontal sync frequency of approximately 15,750 Hz. To provide 256 dots of information across the line scan, and to provide about 20% of the line scan period for retrace, a clock frequency of 330 clock intervals per line scan is used, resulting in a clock frequency of 5.2Mhz (330 × 15,750). This clock frequency is derived from the clock generator 62 and applied to the sync and blanking control 102. The sync and blanking circuit selects 256 clock pulses out of each 330 clock pulses defining one line scan and applies then to the input of a divider chain including a horizontal counter 104 and vertical counter 106. Each stage of the horizontal counter 104 divides the clock frequency by two. Since the clock period corresponds to one increment of resolution between dots on the cathode ray tube screen, it is convenient to refer to the clock frequency in terms of the dot pulse rate. Thus each dot of the 256 dots of information in one line scan occupies a time interval of 1H. Each stage of the horizontal counter 104 divides the clock frequency in half, producing output pulses at intervals of 2H, 4H, 8H, 16H, 32H, 64H and 128H. The vertical counter 106 in turn divides the horizontal output frequency (Horiz. SYNC), the first stage providing an output pulse after each 330 input pulses, that is, after each complete line scan. The outputs of the vertical counter 106 are designated 1V, 2V, 4V, 8V, 16V, 32V, 64V and 128V.

Since a new symbol is generated by addressing the Refresh memory 92 after each group of eight dots, and again after each group of eight horizontal lines, the five highest order outputs from the horizontal counter 104 and vertical counter 106 are used to form the 10-bit address for the Refresh memory 92. The clock pulse 8H is used to load the register 88 with an 8-bit word from the symbol generator 98. The basic clock 1H is used to shift the bits serially out of the video register 88. The three lowest order outputs 1V, 2V and 4V of the vertical counter 106 are used to provide the three line designation bits of the address going to the symbol generator 98. The sync and blanking control circuit 102 resets the horizontal counter 104 at the end of each line scan and resets the vertical counter 106 at the end of each vertical scan. The sync and blanking circuit 102, in generating the proper signals to synchronize a video monitor, utilizes conventional techniques such as described in the publication "Introduction to Solid State Television Systems" by Gerald L. Hansen (prentiss Hall, Inc. 1969).

From the above description, it will be recognized that any symbol information placed in the Video Refresh memory 92 by the CPU 60 is automatically read out and displayed on the monitor screen 16 by the video timing logic 86. To understand the operation of the CPU in loading the Video Refresh memory, it must be kept in mind that the Intel 8080 microprocessor uses the H and L registers in the CPU for temporarily storing the 16-bit addresses applied to the address bus. BEfore considering the operation of the CPU in loading the Refresh memory 92, reference should be made to FIG. 13 which "maps" the memory 92 by relating processer memory addresses to the display screen symbol locations. The higher order of eight bits in the H register are commonly referred to as the memory page and the lower eight bits are referred to as the memory address. While the address bits are coded in straight binary code, for convenience, all addresses are described in the octal format, in which the three octal digits from 000 to 377 represent the 8-bit binary addresses in the H and L registers.

Keeping this address nomenclature in mind, as shown in FIG. 13, the Video Refresh memory 92 is assigned memory pages 340 through 343. Each page of memory includes 256 words having memory addresses numbered 0 through 377 in octal notation. Thus the address of the location in the Refresh memory 92 corresponding to the upper left hand corner of the symbol matrix on the display is H340, L000. The address of the location in memory corresponding to the lower right hand corner is H343, L177. It should be noted that while the page numbers are shown as three octal digits, requiring eight binary bits, only the least significant octal digit changes for the page numbers in the Refresh memory. Thus only the least two significant binary bits in the H register plus the eight bits in the L register are required for addressing any word location in the Refresh memory 92.

For the CPU to change an address to one location to the right on the screen, an octal 1 is added to the least significant digit in the L register, but the page number in the H register is not affected. To address one location to the left, 1 is subtracted from the least significant digit in the L register. To move one location down or up, the address is changed by adding or subtracting 040 to the address number in the L register. If the L register exceeds 377, the contents of the H register are incremented by 1, by the overflow. Thus by manipulating the addresses in this manner, the CPU can select a new location for a player's arrow symbol to move, depending upon the input derived from the associated set of push-buttons.

However, it should be noted that an ambiguity exists at the margins of the symbol matrix. If a symbol is in address location H 341, L137 and it is desired to move the symbol one place to the right by incrementing the address, the number in L changes from 137 to 140. However, the address L140 is adjacent the lefthand margin, a move which is not permissible under the rules of the game. This and other problems of keeping track of the location of each player are overcome by having the CPU first read out of the word stored in the new memory location to determine if it is a legal move. This allows the CPU to check for an illegal move, such as attempting to move into a barrier, before the move is actually made. By loading barrier symbols in the memory locations corresponding to the border positions of the matrix, the CPU is alerted whenever it attempts to move a player's symbol into one of the margin locations by the presence of a barrier symbol. The CPU can only move a player's symbol into a new location which is storing a blank. In the same manner, the CPU can determine when any obstacles are in the course of advancing a player's position. These obstacles need not be fixed, but can be changing with time, as in the case of the barrier trails left behind as the players' symbols are moved across the screen.

It should also be noted that when reading a word out of the Refresh memory 92, the CPU looks at all eight bits although only five of the bits are required to identify the symbol stored in that location. The three additional bits allows every symbol to be assigned up to eight different codes. Table I shows five different codes for each symbol, namely, a general code and a code for each of the four players. This feature enables the CPU to identify whether a barrier symbol, for example, is part of a fixed barrier (general code) or part of the barrier trail of a particular one of the players in the game (player code). By reading out the word associated with the new location on the screen, the CPU can not only determine when a crash occurs but can determine which players are involved in the crash. The three highest order bits can also be used by the video control logic to provide color information to the monitor to display each player's symbols in a unique color.

Two Player Game

Consider first the operation of the CPU in controlling a two-payer game. As noted above, the CPU contains, in addition to the arithmetic unit with its accumulator or A-register, a group of six general purpose registers. The H and L registers, as noted, store the address of the currently selected location on the display screen. The B register is used to store the current direction for a player about to move. The direction codes are defined as 000 for up; 001 for right; 002 for down; and 003 for left. The C register is used to store the code for the current player who is about to move. In a two player game, the codes are 010 for Player #1 and 014 for Player #2. The D and E registers are used for temporary storage of intermediate calculations. The memory 72, addressed as memory page 377, functions in part as an extension of the general purpose registers. Specific locations in the memory 72 are permanently assigned for storing specific information according to the following table:

TABLE II

| REGISTERS IN MEMORY 72 | |
|---|---|
| Address | Contents |
| L000, H377 | Player #1 position (address) |
| 001 | Player #1 position (page) |
| 002 | Player #2 position (address) |
| 003 | Player #2 position (page) |
| 004 | Player #1 direction |
| 005 | Player #2 direction |
| 006 — Who moves first? | 0: Player #1; 1: Player #2 |
| 007 | Player #1 score |
| 010 — | Player #2 score |
| 016 — | Player #1 push button image |
| 017 — | Player #2 push button image |

The CPU has instructions for loading the locations in page 377 from the six registers and loading the registers from the memory locations. All of the instructions available to the CPU are described in the above-identified User's Manual for the 8080 Microcomputer System.

Figure 14:
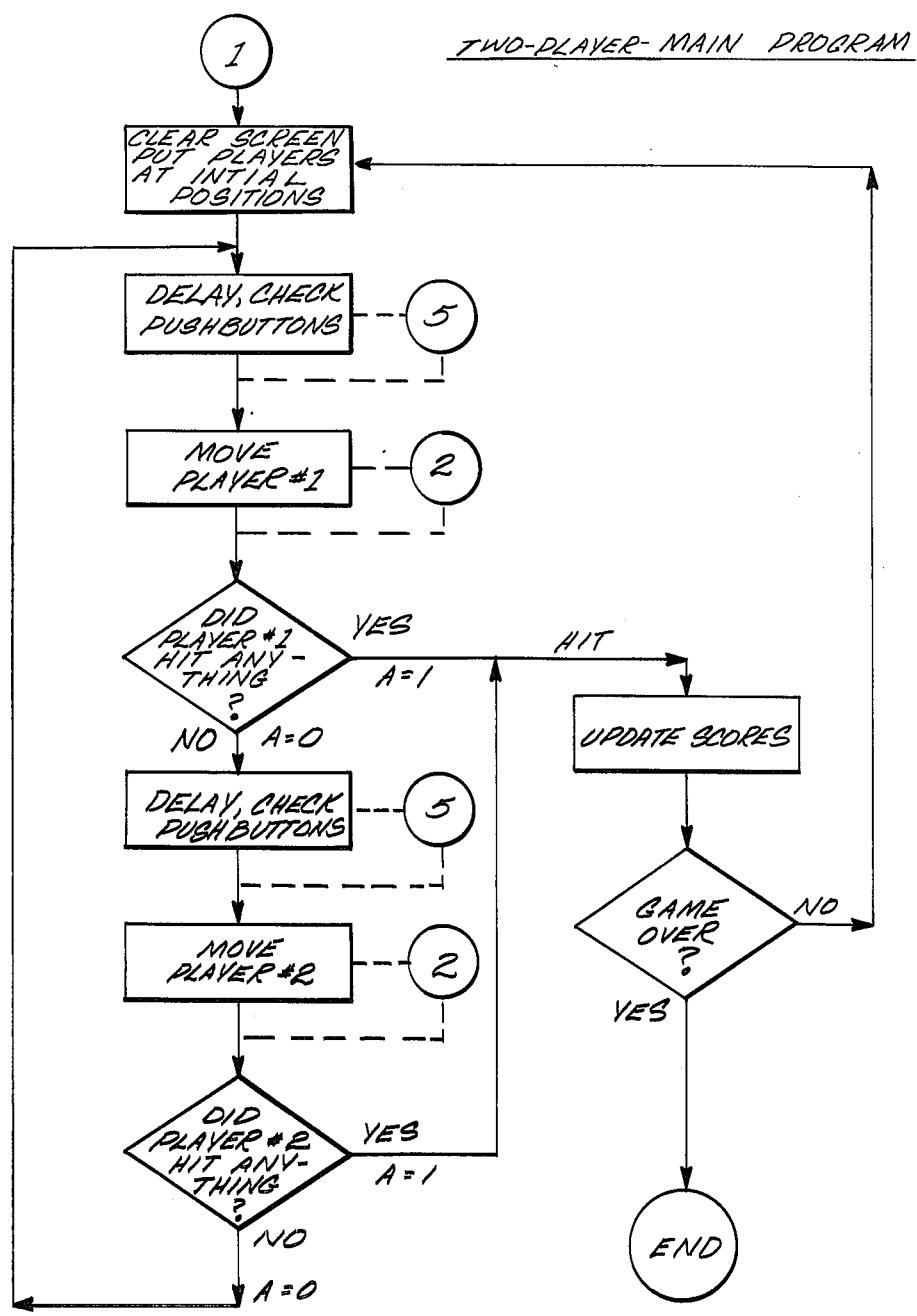

Referring to the flow diagram in FIG. 14, the main program flow for the two player game is shown. In the flow diagram, the circles which have dotted lines entering and leaving them indicate subroutines which are detailed in subsequent flow charts. At the beginning of the game, as the first step in the flow diagram, the cathode ray screen is cleared by writing a blank symbol at every location in the matrix displayed on the screen. The fixed boundaries are then established by storing the appropriate symbols in the border locations and the respective arrows for the two players are stored in the starting positions with the appropriate directions, all as illustrated in FIG. 2. The basic game action then proceeds as the program advances through successive operations. Thus during the second step, the program enters a subroutine 5, in which, during a predetermined delay (typically 0.5 sec.), the status of the two sets of player push buttons are monitered, an output to the tone generator activates an audible tone whose pitch is set by the current direction of one of the players, and the push button image data in address locations 016 and 017 of the memory 72 are updated. The delay sets the pace of the game and is selected to test the reaction time of players in manipulating the control buttons. After returning to the main program, Player #1 is moved one space. This is accomplished by subroutine 2 which also sets the accumulator register in the CPU to indicate whether the move was legal or whether there was a collision. After returning from subroutine 2, the main program then tests the status of the accumulator register to determine whether to proceed or branch out of the main program flow to score a crash.

Assuming no crash, the program advances to the next step and again enters subroutine 5, where after a delay, the push-buttons are again checked. Then Player #2 is moved, using subroutine 2. On returning to the main program, the status of the accumulator register is again tested to determine if the move of Player #2 was legal or whether a crash took place. Assuming the move was legal, the program loops back to the second step and repeats the operation until one of the players crashes into a barrier. If either player crashes, the main program branches to a HIT routine in which a crash symbol is displayed on the screen at the new location, a boom sound signalling a crash is generated by the audio generator, and the scores are updated. The scores are then tested to determine whether either player has reached a predetermined number of crashes, in which case the game is terminated, or if not, the program loops back to the first step to initiate a new round.

One feature of the main program not shown in the flow diagram, FIG. 14, is that alternate players move first in successive rounds. This is accomplished by having the program check the address location 006 in the memory 72, which, as shown by TABLE II, indicates by a 0 or 1 in the least significant bit which player moves first. This register is incremented every round to switch the starting player.

From the program listing in Appendix I it will be seen that the first step when play is initiated is to call up the subroutine for initializing the game (CAL INIT). The INIT subroutine clears the screen and draws the screen boundaries using the boundary (BDY) subroutine. It then places the players' symbols at their starting locations. Player #1 is placed at location L 245 page 340 with an initial down direction (002) and Player #2 is placed at L332, H342 with an initial up direction (000). The appropriate registers in the memory 72 (page 377) are set to the initial player positions, directions, and push-button images. The push-button image registers (016 and 017, page 377) are initialized to indicate down (002) for Player #1 and up (000) for Player #2. The BDY subroutine operates to first clear the screen by writing "blank" symbols into all memory locations of the Video Refresh memory 92. Next, the horizontal and vertical wall symbols are written into the memory locations which define the perimeter of the screen, and finally the corner symbols are placed at the corners.

Figure 15:
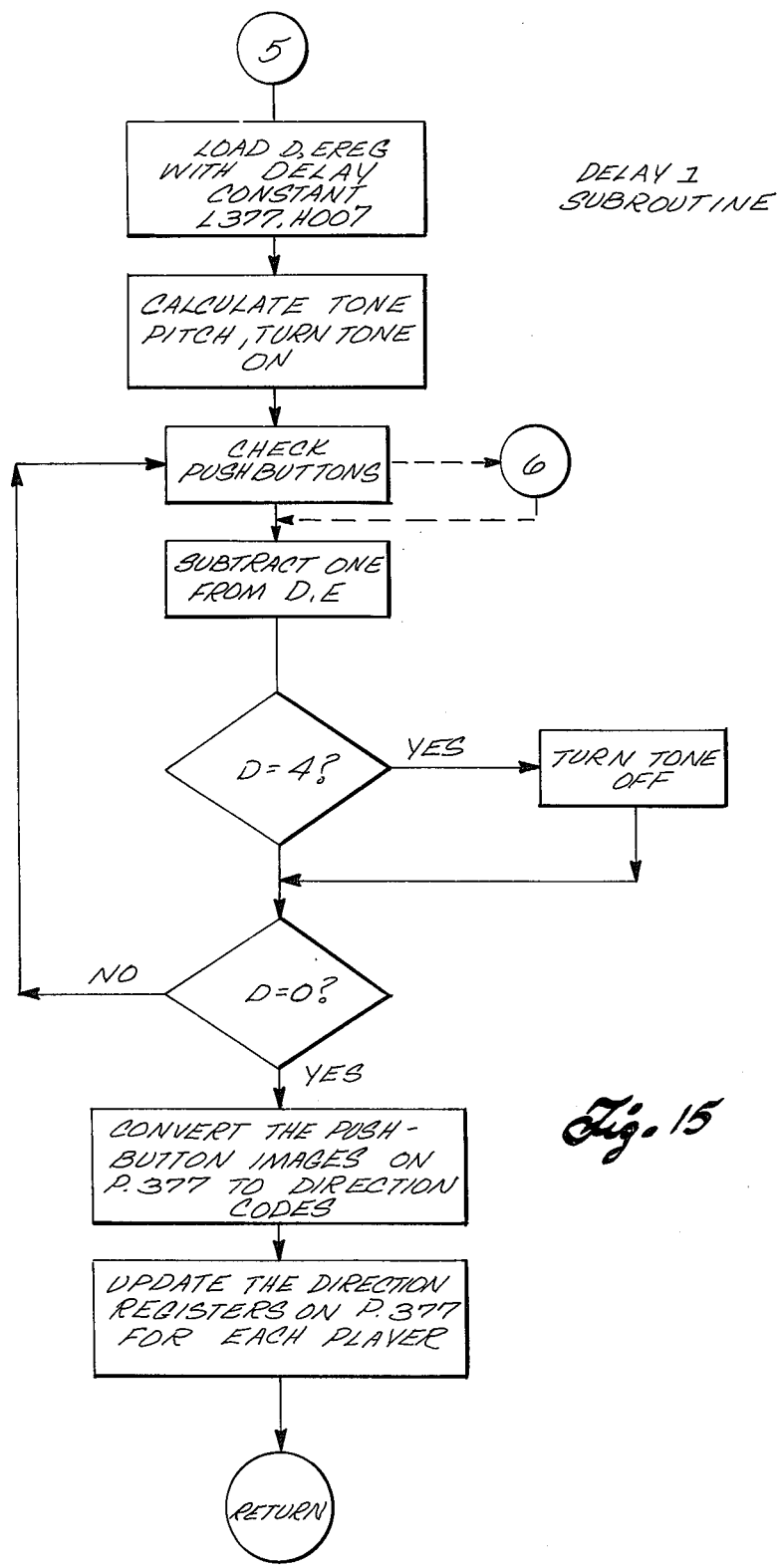

Referring again to the main program FIG. 14, after the status of the First Move flip-flop is interrogated and re-set in memory location 006 page 377, the program calls a DELAY 1 subroutine for either Player #1 or #2 (subroutine 5 of FIG. 14). The flow diagram for the DELAY 1 subroutine is shown in FIG. 15. The first step in the DELAY 1 is to load the D and E registers with a delay constant. The next step is to calculate the tone pitch, initiate an output of the tone pitch data to the output port 78 to set the tone generator, and turn the tone on. This is accomplished by adding the contents of the B register and C register in the CPU. The B register contains the direction code for the player currently moving, while the C register contains a constant, which indicates which of the two players is currently moving (010 for Player #1 and 014 for Player #2). By adding the contents of these two registers, a unique number for each player and direction is generated which is then scaled to represent a wider range by multiplying by 8 and adding 7. The scaled number is then sent to the tone generator by the CPU over the data bus to the output pot 78 which loads the information in the tone generator 80. The tone generator generates an audible sound having a pitch that is proportional to the scaled number received at the output port.

Next the program checks the push-button status information at the input port 76. This requires entrance into a push-button check (PBCK) subroutine which reads the states of the player push-buttons. This subroutine reads the push-buttons and updates the push-button image registers 016 and 017, page 377 in memory 72.

Next, the D and E registers, functioning as a single 16 bit register, are decremented by 1. A test is then made to determine if the D register has reached 004, which is approximately half the total time delay. If so, the tone generator is turned off. A test is then made to determine if the D register has been counted down to 0. If not, the program loops back again checking the push-button status and decrementing the D and E registers by 1. When the D register is finally decremented to 0, the program converts the push-button images to direction codes, and then stores these direction codes in the direction registers (004 and 005) in memory page 377.

Figure 16:
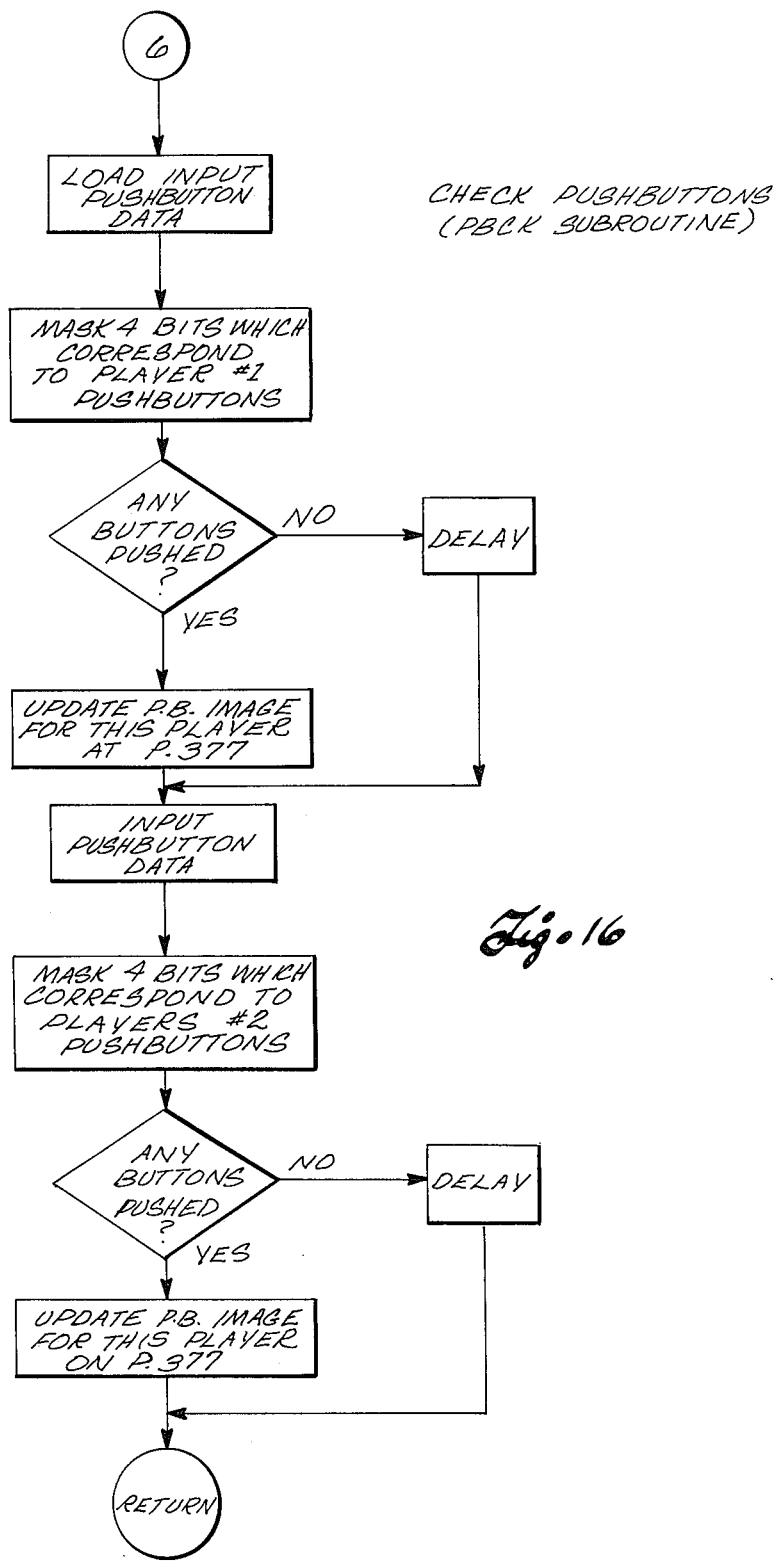

The check push-button subroutine entered at 6 in the flow diagram of FIG. 15 is shown by the flow diagram in FIG. 16. The first step of the PBCK subroutine is to input the push-button data from the push-button sets through the input port 76. An 8-bit word is generated at the input port in which the first four bits represent the condition of the four push-buttons of Player #1 and the other four bits represent the condition of the push-buttons of Player #2. A non-depressed button is indicated by a binary 1 and a depressed button is indicated by a binary 0 for the associated bit in the input word.

Next the four bits corresponding to Player #1 are tested to determine if any of the buttons has been activated, as indicated in the next two steps of the flow diagram in FIG. 16. If so, the push-button image register in memory 72 (address 016, page 377) is updated. If no push-buttons have been pushed, a delay is introduced and the program skips the updating routine. The delay introduces a comparable time period in the program so that the same program time is involved whether or not push-button updating is required. This is necessary to insure that the time required for the two players to advance is not affected by the push-button check subroutine. The same steps are then repeated on the four input bits from the push-buttons for Player #2, as indicated at 156. The program listed for the PBCK subroutine is shown in Appendix I in which the routines TICK 1 and TICK 2 represent the equal-time delay branches discussed above. The NOP (No Operation) instructions are necessary to insure that the two program branches occupy the same number of time states and thus insure that the two players advance at equal rates.

The other subroutine involved in the DELAY 1 subroutine is the BIN subroutine in which the push-button images are converted to direction codes as indicated at 7 in the flow diagram in FIG. 15. This is accomplished by using the D register to count the number of times the image data must be shifted right until a 0 is encountered. The routine which calls the BIN subroutine sets the four least-significant bits of the push-button word to binary ones if the conversion is to be done for Player #2. In this manner the BIN subroutine may be used for both players. If the push-button image of Player #2 is converted by the BIN subroutine, the number of right shifts required to find a 0 will be 4, 5, 6 or 7. These numbers are converted by the program respectively to 0, 1, 2, or 3 so that the correct direction data results.

For example, assume the push-button data indicates Player #1 is moving downward. The push-button image for this case reads 0000 1011. This data is shifted 3 times to the right before the 0 is detected (in the carry bit). Thus the register count in the D register is 002, which is the proper code for the down direction. Suppose the push-button data indicates Player #2 moving to the right. The push-button image data is then 1101 1111 and six rightshifts are required to detect the 0. This results in a count of 5 in the D register, which when masked to indicate only the two least-significant bits becomes 001, which is the proper code for the direction to the right.

Figure 17:
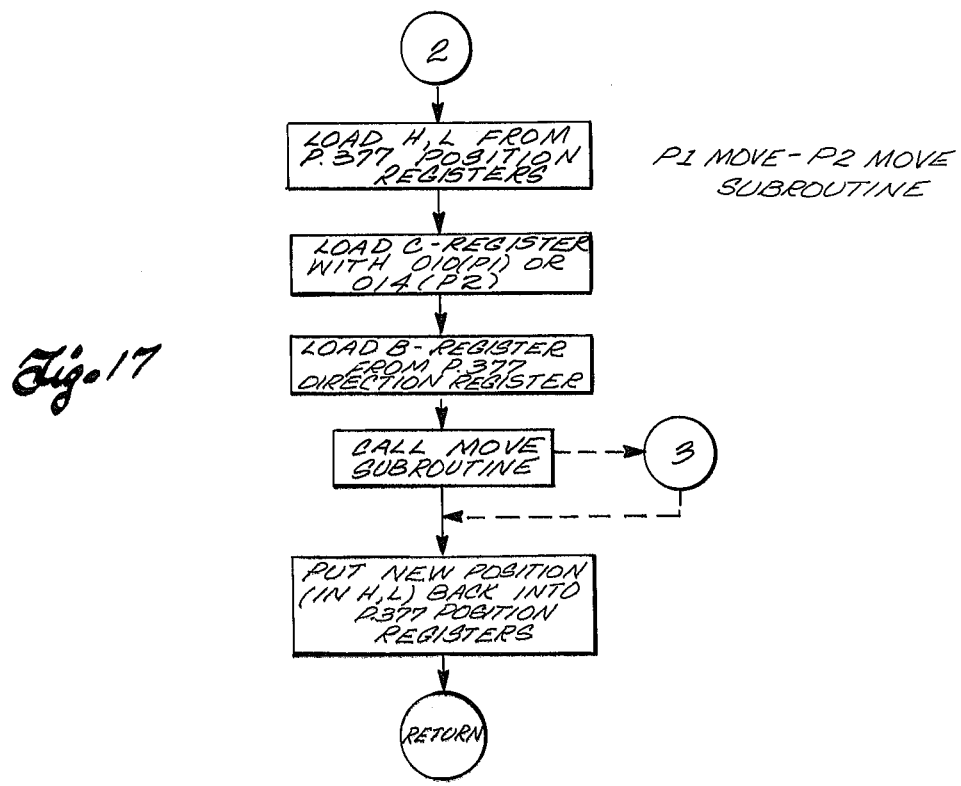

On completion of DELAY 1 subroutine, the main program enters a subroutine for actually moving the associated player on the screen, as indicated at 2 in FIG. 14. This involves the P1MOVE and the P2MOVE subroutines. The flow diagram for these subroutines which are substantially identical, is shown in FIG. 17. The first step, as shown by the flow diagram, is to load the H and L register from the player position registers in the memory 72 (Page 377, Locations 000 and 001 for Player #1 and Locations 002 and 003 for Player #2). Next, the C register is loaded with the appropriate code for the player involved, namely 010 for Player #1 or 014 for Player #2. The B register is then loaded from the appropriate direction register in memory 72 (004 for Player #1 or 005 for Player #2). The MOVE subroutine, indicated at 3 in FIG. 17 is then called which determines the new position and direction of the player arrow symbols and the symbols to be written in the current position. Finally, the new position address which is stored in the H and L registers by the MOVE subroutine, is written back into the position registers in memory 72.

Figure 18:
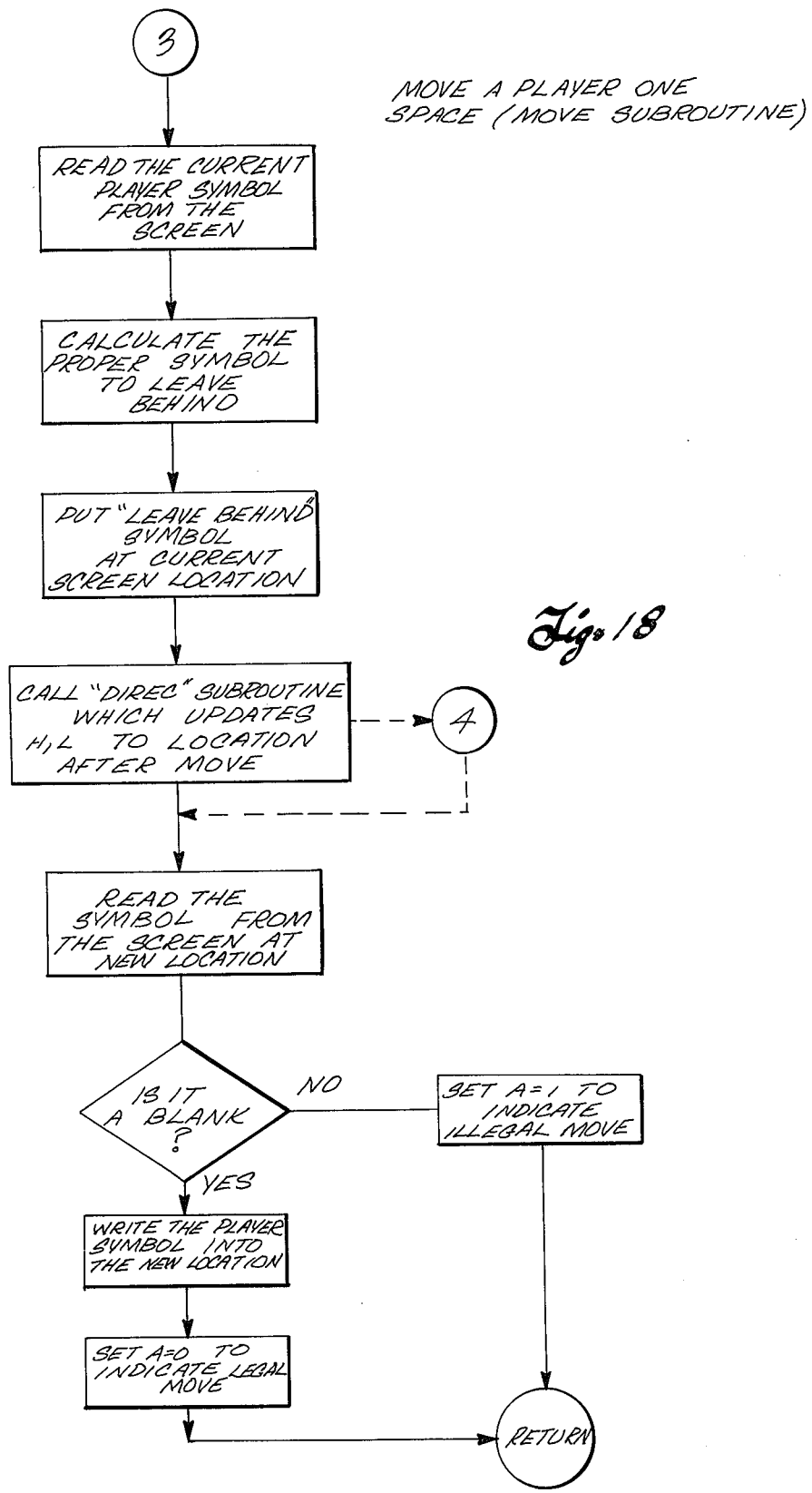
Figure 23:
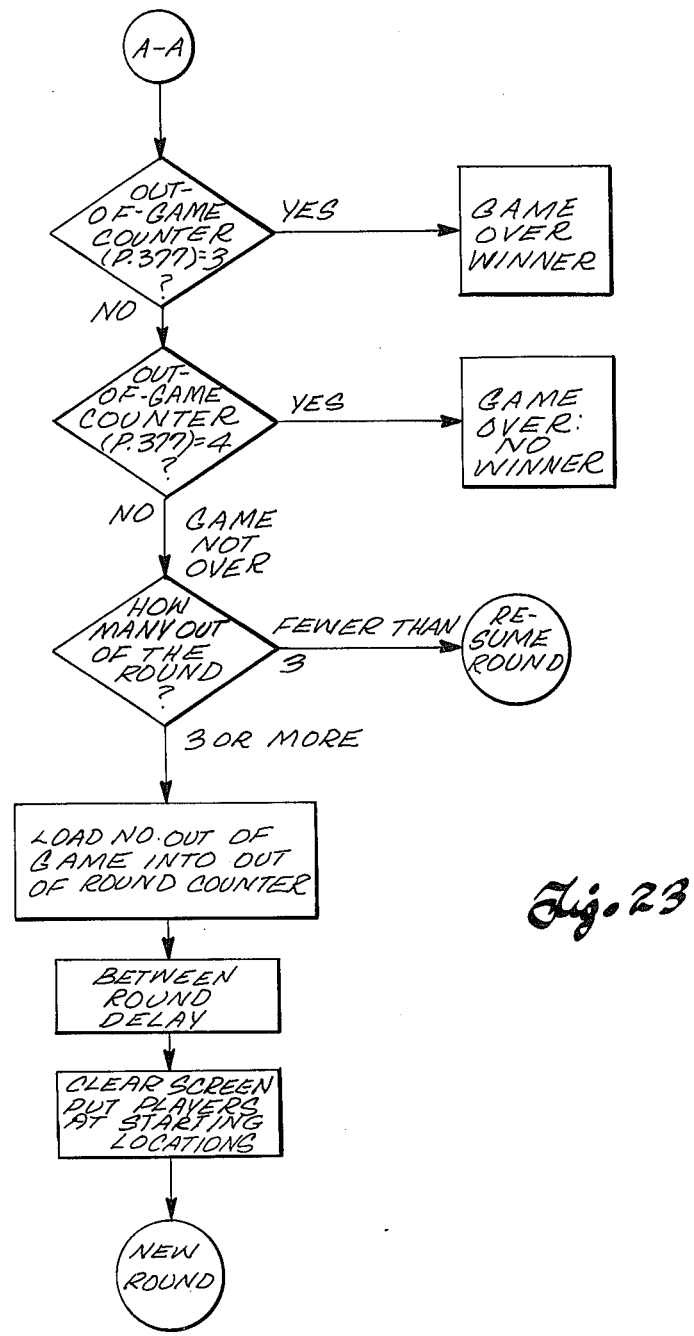

The MOVE subroutine is shown in the flow diagram of FIG. 18. The first step is to read the player symbol at the current position in the Video Refresh memory 92. From this symbol code, the program is able to determine the previous direction of the player since the two least-significant bits of the eight player symbol codes (010 through 017 in TABLE I) correspond to the direction of the arrow. (0 for up, 1 for right, 2 for down and 3 for left). Using this code information together with the new direction contained in the B register, the next step of the program as shown by flow diagram 18 is to calculate the code for the symbol to be left behind after the move is made. There are 14 possible "leave behind" characters in the game of the present invention, namely, a straight horizontal wall section, a straight vertical wall section, one of four corner wall sections, and one of four arrows for each player pointing in the four different directions, which are used when a player has turned back on himself. For example, see FIG. 6 in which player arrow 26 is the "leave behind" character or symbol. These symbol codes are stored in a sixteen word table in the ROM memory 74 and addressed by using the two old direction bits and two new direction bits as a four bit address. For example, if the two least significant bits masked from the current symbol code correspond to an old direction of down, namely, 10 (or octal 2) and the new direction bits in the B register correspond to the code for left, namely, 11 (or octal 3), the address 1011 is used to address the corresponding location in the table where the code for the lower right corner symbol (003) is stored. The following table indicates the relative addresses and the symbols stored in those addresses.

TABLE III

| | TABLE ADDRESS | | TABLE DATA | |
|---|---|---|---|---|
| Item | Old Direc. Code | New Direc. Code | Leave Behind | Symbol |
| 1 | 0 0 | 0 0 | Up-Up | □ |
| 2 | 0 0 | 0 1 | Up-Rt | ⌐ |
| 3 | 0 0 | 1 0 | Up-Dn | ↓ |
| 4 | 0 0 | 1 1 | Up-Lft | ⌐ |
| 5 | 0 1 | 0 0 | Rt-Up | ⌐ |
| 6 | 0 1 | 0 1 | Rt-Rt | □ |
| 7 | 0 1 | 1 0 | Rt-Dn | ⌐ |
| 8 | 0 1 | 1 1 | Rt-Lft | ← |
| 9 | 1 0 | 0 0 | Dn-Up | ↑ |
| 10 | 1 0 | 0 0 | Dn-Rt | ⌐ |
| 11 | 1 0 | 1 0 | Dn-Dn | □ |
| 12 | 1 0 | 1 1 | Dn-Lft | ⌐ |
| 13 | 1 1 | 0 0 | Lft-Up | ⌐ |
| 14 | 1 1 | 0 1 | Lft-Rt | → |
| 15 | 1 1 | 1 0 | Lft-Dn | ⌐ |
| 16 | 1 1 | 1 1 | Lft-Lft | □ |

DIRECTION CODES:
0 0 = Up; 0 1 = Right
1 0 = Down; 1 1 = Left

The "leave behind" symbol read out of the table is then stored back in the Video Refresh memory at the current location to replace the image appearing on the screen at the associated location on the display matrix.

The next step in the MOVE subroutine, as shown at 4 in FIG. 18, is to enter the DIREC subroutine in which the address for the new screen location is calculated, and the H and L registers updated to reflect the new location on the screen after the move. The next step in the MOVE subroutine requires that the current symbol in the new location be read out of the Video Refresh memory to the CPU before the new symbol is loaded into the new location. If a current symbol in the new location is a blank, the move is legal and a player arrow symbol is then stored in that location which points in the direction of the current move. The accumulator or A register is set to 0 to indicate a legal move and operation returns to the appropriate P1 MOVE or P2 MOVE subroutine. If the existing symbol stored in the new location is not a blank, the accumulator is set to 1 to indicate an illegal move and the MOVE subroutine returns to the P1 MOVE or P2 MOVE subroutines.

Figure 19:
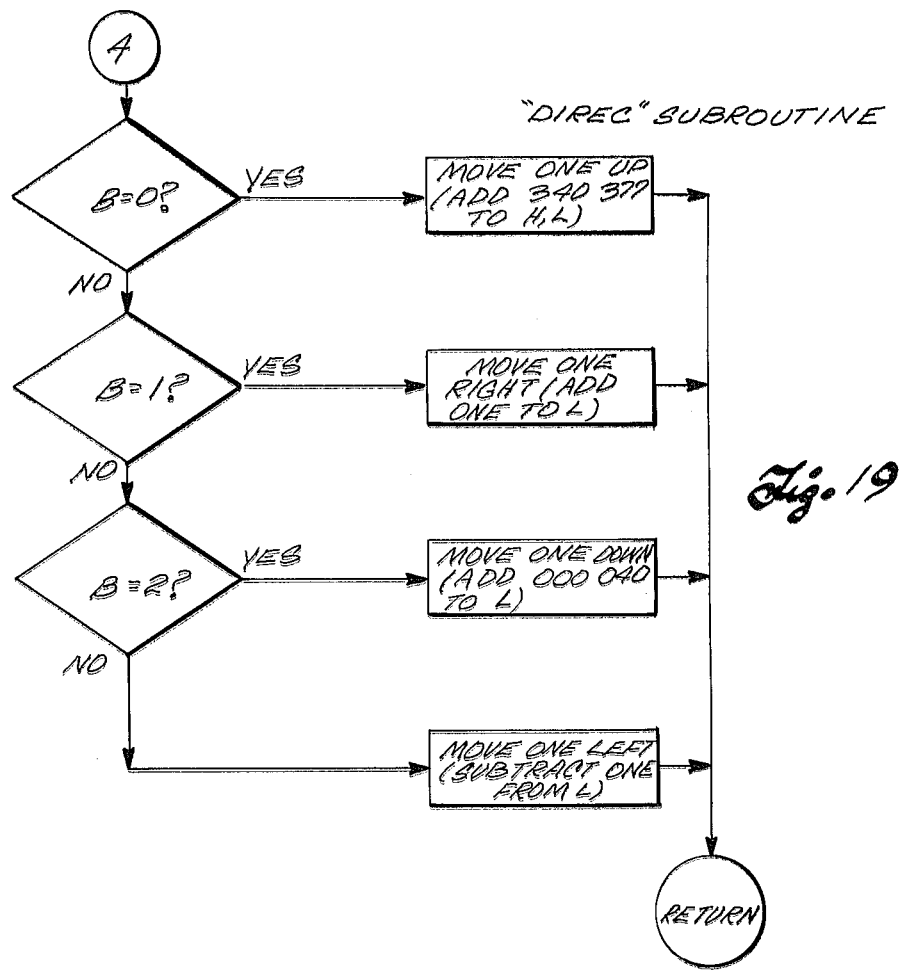

It will be noted that the MOVE subroutine calls in a DIREC subroutine, as indicated 4 in the flow diagram of FIG. 18, for updating the H and L registers to identify the new location of the player in the Refresh memory after the move. The flow diagram for the DIREC subroutine is shown in FIG. 19. The DIREC subroutine interrogates the B register to determine which direction to move a player's arrow symbol. This is done by modifying the address of the current position to the address of the new position in the manner shown in FIG. 13. It will be seen from the flow diagram that if the B register is 000, which is the direction code for up, the program branches to the proper routine to update the H and L registers by subtracting 040 from the current address in the H and L registers. If the contents of the B register is 001, which is the code for right, the program branches to the routine for adding 001 to the L register. If the contents of the B register is 002, which is the code for down, the program enters the routine for adding 040 to the L register. Finally, if the B register is 003 which is the code for a move to the left, the program enters the routine for subtracting 001 from the L register.

Four Player Game

To provide a game with four players, the program for controlling the CPU is similar in many respects to the program as described above, but some of the subroutines must be modified and extended. The following table shows memory page 377 (the memory 72) assignments for the four player game.

Table IV

| 0–1 | Player #1 position |
|---|---|
| 2–3 | Player #2 position |
| 4–5 | Player #3 position |
| 6–7 | Player #4 position |
| 10 | Player #1 direction |
| 11 | Player #2 direction |
| 12 | Player #3 direction |
| 13 | Player #4 direction |
| 20 | Player #1 Eradication Flag |
| 21 | Player #2 Eradication Flag |
| 22 | Player #3 Eradication Flag |
| 23 | Player #4 Eradication Flag |
| 24 | Player #1 Pushbutton image |
| 25 | Player #2 Pushbutton image |
| 26 | Player #3 Pushbutton image |
| 27 | Player #4 Pushbutton image |
| 30 | Number of players out of the round (0–4) |
| 31 | Number of players out of the game (0–4) |
| 32 | Player #1 Out-of-game flag |
| 33 | Player #2 Out-of-game-flag |
| 34 | Player #3 Out-of-game flag |
| 35 | Player #4 Out-of-game flag |
| 36 | Player #1 Out-of-round flag |
| 37 | Player #2 Out-of-round flag |
| 40 | Player #3 Out-of-round flag |
| 41 | Player #4 Out-of-round flag |

From the above table it will be seen that certain additional items of information are required for a four player game. Thus the program must be able to keep track of the number of players out of a particular round, the number of players which have been eliminated from the game, which players are out of the round or out of the game and which player or players are to be removed from the playfield as the result of a crash (the Eradication flags). In the four player game, the C register in the CPU has four possible codes to indicate which player is being moved, namely, 010 for Player #1, 014 for Player #2, 020 for Player #3 and 024 for Player #4.

The program for the four player game utilizes the ability of the hardware to assign different character codes to the same image. That is, the symbol generator 98 only requires 5 bits to identify a symbol or character leaving three additional bits which can be used to store information regarding the symbol, such as which player is identified with that symbol. The code for each of the symbols for each of the different players is shown in Table I above. In the table it will be seen that there are five distinctive codes for each symbol. A distinctive code is available to the program depending upon whether the symbol is related to one of the four players or is part of the stationary boundary. By having each symbol or character code unique to a particular player, it is possible to selectively eradicate the barrier of any player during the course of a round.

Referring to FIG. 20, there is shown a flow diagram for the main program of the four player game. At the start of a new game, the program initially clears the registers 20-41 of memory page 377 ( in memory 72). The next step in the program is to clear the screen, draw the screen boundaries, position the player symbols at their initial locations and initialize the position and direction registers for the four players in memory page 377. Push button image registers for the four players are also initialized to point Player #1 in a down direction, Player #2 in a left direction, Player #3 in an up direction, and Player #4 in a right direction. Next, the program tests whether each of the four players in sequence is in the game. This is done by checking the out-of-game flag in address locations 32-35 in memory page 377. If a player is not out of the game, a test is made to determine whether he is out of the round. A collision may remove a player from a round but until his score is reduced to zero, he continues to play in additional rounds until he losses enough rounds (e.g., four rounds) to be eliminated from the game or until he wins the game. If the player is out of the round, the program continues to test the next players in sequence until a player is found that is both in the game and in the round. The program then branches to a subroutine, indicated at 5' in FIG. 20, in which a time delay (e.g. 0.25 sec.) is introduced. Also the push-button images are updated in the registers 24-27 of memory page 377. This is accomplished by the DELAY1 subroutine described above (see FIG. 15) in connection with the two player game, but with a shorter delay constant loaded into the D and E registers of the CPU. The program then enters a subroutine indicated at 2', in which the player is moved to the new location on the screen. This subroutine also checks for a player hitting an obstacle and takes appropriate action if a crash is detected, including taking the player out of the game.

After the fourth player is serviced by the program, if a round is still in progress, the program re-enters at the point where the Player #1 is tested to determine if he is still in the game. If a round has been completed and a new round is to be played, the program branches back from the subroutine at 12 directly to the second step of the main program in which the screen is cleared and the players are positioned for the start of a new round.

One thing that should be observed from FIG. 20 is that as a player crashes and is removed from a game, or removed from a round, the action of the game speeds up. This is because each player has a time delay associated with his action. Thus, four time delays occur between successive moves of a given player when all four players are in the game. This is reduced by one player delay with each player removed from a round. With only two players remaining in the game, only two time delays are involved between moves of a given player. Therefore a player moves at twice the rate as when four players are still in the game.

The P1MOVE-P4MOVE subroutine indicated at 2' in FIG. 20 for moving a player is shown in the flow diagram of FIG. 21. This P1MOVE-P4MOVE subroutine differs from that described for the two player game as described above in connection with flow chart FIG. 17 in that the C register is loaded with the code for any one of four players instead of only two players and the check made in the A register to determine whether or not a player hit an obstacle is made at the end of this subroutine rather than in the main routine, as was done in the two player game. If a hit occurs, the routine branches to a HIT subroutine indicated at 13 in FIG. 21.

The MOVE subroutine at 3' in FIG. 21 is similar to the MOVE subroutine for the two player game indicated at 3 in the flow diagram of FIG. 18. The principal difference is in the addition of a subroutine WHICH P to create the proper symbol code for the player or boundaries. This subroutine is entered before writing the leave-behind character and before writing the player's symbol at the location on the screen.

The character or symbol, as computed by the MOVE subroutine has a code range of 000 to 037 (5-bit code) as in the two-player game. The WHICH P routine adds 040 to the symbol code for Player #1, adds 100 for Player #2, 140 for Player #3, and 200 for Player #4. This creates the proper symbol codes for both the trail barriers and the moving arrows associated with the individual players, as set forth in TABLE I above. Referring to the flow diagrams of FIGS. 22 and 23, the HIT subroutine steps are shown. The first step is to initiate an output to the audio generator to generate a "BOOM" sound characteristic of a crash. The C-register is then tested to determine which player was currently moving when the crash occurred. The Eradication flag of the player who crashed is set to "1". This flag is later tested by the ERAD subroutine to determine which player or players to remove from the screen. Also the out-of-round flag of the player who crashed is set to 1. This flag is tested by the main program to determine whether or not a player is allowed to move. The register at address 030 page 377, which stores the number of players out of the round is incremented by one. This register is tested later in the program to determine whether or not a round is over. Finally, the score of the player who crashed is decremented. If this player's score reaches zero, his out-of-game flag in page 377 is set to one.

Continuing with the flow chart on FIG. 22, the program next reads the old symbol code from the location in the Video Refresh memory corresponding to the collision location. This symbol is then tested to determine whether or not another player was hit. If the symbol in the collision location is the arrow of another player, the player that has been hit is also removed from the round in the same manner as the player who crashed. A display CRASH symbol is then displayed at the collision location by a FLASH subroutine for a short period of time after which the program calls in the ERAD subroutine, as indicated at 14, and any players whose eradication flags have been set to one are removed from the screen.

The program then makes several tests. It first tests to see whether three players are out of the game, as indicated by the out-of-game counter at memory page 377 address 031. If three players are out of the game, the game is terminated with a winner. If the out-of-game counter is set to four, the game is terminated with no winner. This occurs when two players, remaining in a game, are down to their last crash and they hit each other.

If more than one player is still in the game, a test is made to determine if two or three players remain active in the game. If two or three players remain active in the game, the main program is reentered at RESUME ROUND (see flow diagram of FIG. 20) and the round continues. However, if three or more players are out of the round, a new round must be initiated. First the out-of-round counter at memory page 377, address 030 is initialized by the contents of the out-of-game counter at memory page 377, address 31. It will be noted that by definition, any player out of the game is also out of the round. After a between-round delay sufficient to allow the players to get set for another round, the INIT subroutine clears the screen and puts the players remaining in the game at their starting locations. The subroutine then returns to the main program at the point indicated as NEW ROUND, as shown in the flow diagram of FIG. 20.

The HIT subroutine calls in several subroutines. One is the INHITF subroutine which operates to increment the out-of-round counter at memory page 377, address 030. The routines DCRP1-DCRP4 decrement the scores of the respective players. While virtually any scoring system can be used, groups of arrows displayed in the outer boundary at each player location are used to indicate the score, as shown in FIGS. 7-9. Each player initially may have a score of 4, for example, which is reduced by one each time the player crashes.

The ERAD subroutine checks the symbol at the collision location to determine whether it represents a trail barrier left behind by a player or represents the outer wall or boundary. A blank is inserted at the collision location with the trail barrier of another player but not at the collision location with the outer wall. The ERAD subroutine then checks the eradication flag for each of the four players. If the flag is set for a particular player, the proper subroutine ERADP1-ERADP4 is called depending on which player has crashed and the E register is set to a value which establishes the range of symbol codes to be searched for on the screen. A WIPOUT subroutine then removes all symbols having a code within the range corresponding to the player or players whose eradication flags have been set.

The following program listings show the complete programs for the operation of the CPU 60 in both the two-player game (Appendix I) and the four-player game (Appendix II). The listings shows machine code in the left-hand column, assembler language code in the right-hand column. The mnemonics are those used in the assembler for the Intel 8080 microprocessor as developed and sold by Control Logic, Natick, Mass. Descriptive headings are also provided throughout the listing to identify routines, subroutines, groups of constants, etc. Addresses and other numeric representations are in their digit octal notation. Instructions which use addresses list the address (L) first and the page (H) second.

APPENDIX I  TWO-PLAYER GAME

```
00 000 061 200 377              LXI SP 200 ,377
00 003 315 016 001              CAL DCOIN
00 006 061 200 377  START,      LXI SP 200 ,377
00 011 257                      XR A                    / A = 0
00 012 062 007 377              STA 007 ,377            / P1 SCORE = 0
00 015 062 010 377              STA 010 ,377            / P2 SCORE = 0
00 020 057                      CMA                     / 377
00 021 062 012 377              STA 012 ,377            / RANDOM SEED
00 024 323 002                  OUT 002                 / TONE OFF
00 026 323 010                  OUT 010                 / BOOM OFF
00 030 333 001                  INP 001                 / CHECK JUMPERS FOR END SKR
00 032 366 007                  ORI 007                 / SET 3 LSB FOR BIN
00 034 346 177                  NDI 177                 / CLEAR MSB (COIN BIT)
00 036 315 037 002              CAL BIN
00 041 306 003                  ADI 003
00 043 062 011 377              STA 011 ,377            / END GM IS 3,4,5,6
00 046 333 001                  INP 001                 / CHECK FORCOIN
00 050 027                      RAL
00 051 332 141 000              JTC ADPLAY
00 054 257           NUPLAY,    XR A
00 055 062 014 377              STA 014 ,377            / SET FLAG=0:  GAME IN PROGRESS
00 060 315 016 001              CAL DCOIN
00 063 315 251 000   PLAY,      CAL INIT
00 066 072 006 377              LDA 006 ,377            / FIRST MOVE FLIP-FLOP
00 071 074                      INA
00 072 346 001                  NDI 001
00 074 062 006 377              STA 006 ,377
00 077 312 120 000              JTZ P2FIRS
00 102 315 220 001   P1FIRS,    CAL DELAY1
00 105 315 113 001              CAL P1MOVE
00 110 376 000                  CPI 000
00 112 302 060 002              JFZ HIT
00 115 315 321 000              CAL P1ADJ
00 120 315 220 001   P2FIRS,    CAL DELAY1
00 123 315 133 001              CAL P2MOVE
```

APPENDIX I TWO-PLAYER GAME - Continued

```
00 126 376 000              CPI 000
00 130 302 060 002          JFZ HIT
00 133 315 333 000          CAL P2ADJ
00 136 303 102 000          JMP P1FIRS
                    /
                    /
00 141 076 001      ADPLAY, LAI 001
00 143 062 014 377          STA 014 .377    / ADV. FALG = 1
00 146 315 334 002          CAL MESGE
00 151 315 221 000          CAL BIGDEL      / BETWEEN MOVES DELAY (ADV)
00 154 315 113 001          CAL P1MOVE
00 157 315 133 001          CAL P2MOVE
00 162 315 304 001  ADAGN,  CAL DELAY2
00 165 315 324 001          CAL RNDGT1
00 170 315 113 001          CAL P1MOVE
00 173 376 000              CPI 000
00 175 302 060 002          JFZ HIT
00 200 315 304 001          CAL DELAY2
00 203 315 350 001          CAL RNDGT2
00 206 315 133 001          CAL P2MOVE
00 211 376 000              CPI 000
00 213 302 060 002          JFZ HIT
00 216 303 162 000          JMP ADAGN
                    /
                    /
00 221 041 000 000  BIGDEL, LXI HL 000 .000  / CALLED BY ENDGM ONLY
00 224 315 007 001  BGD,    CAL COIN
00 227 043                  INX HL
00 230 174                  LA H
00 231 376 377              CPI 377
00 233 310                  RTZ
00 234 303 224 000          JMP BGD
                    /
                    /
00 237 036 013      HUGDEL, LEI 013
00 241 315 221 000  HDL,    CAL BIGDEL
00 244 035                  DCE
00 245 302 241 000          JFZ HDL
00 250 311                  RET
                    /
                    /
                    /   P. 377 LOCATIONS DEFINED AS FOLLOWS:
                    /   0-1  P #1 POSITION
                    /   2-3  P #2 POSITION
                    /   4    P#1 DIREC
                    /   5    P#2 DIREC
                    /   6    FIRST MOVE FLIPFLOP: LSB=0: P1, LSB=1; P2
                    /   7    P#1 SCORE
                    /   10   P#2 SCORE
                    /   11   END GAME SCORE
                    /   12,13 RANDOM NUMBER POLYNOMIAL
                    /   14   ADVERT. FLAG: 0=GAME; 1=ADVER.
                    /   16   PUSHBUTTON IMAGE P1
                    /   17   PUSHBUTTON IMAGE P2
                    /   THROUGHOUT THE GAME, THE REGISTERS HAVE
                    /   THE FOLLOWING SIGNIFICANCE:
                    /
                    /   A  SCRATCH
                    /   B  CURRENT DIRECTION
                    /   C  CURRENT PLAYER  P1=010  P2=014
                    /   D  SCRATCH
                    /   E  SCRATCH
                    /   H,L DISPLAY SCREEN COORD.
                        PAGE
                    /
00 251 315 214 003  INIT,   CAL BDY         / DRAW BOUNDARIES
00 254 041 245 340          LXI HL 245 .340 / P1 INIT POSITION
```

APPENDIX I TWO-PLAYER GAME - Continued

```
00 257 042 000 377         STHL 000 "377
00 262 066 012             LMI 012          / 01 INIT CHAR (DN)
00 264 076 002             LAI 002          / P1 INIT DIREC (DN)
00 266 062 004 377         STA 004 "377
00 271 041 332 342         LXI HL 332 "342 / P2 INIT POSITION
00 274 042 002 377         STHL 002 "377
00 277 066 014             LMI 014          / P2 INIT CHR (UP)
00 301 076 000             LAI 000          / P2 INIT DIR (UP)
00 303 062 005 377         STA 005 "377
00 306 076 373             LAI 373          / 11111011=DN
00 310 062 016 377         STA 016 "377     / P1 PUSHBUTTON IMAGE (DN)
00 313 076 357             LAI 357          / 11101111
00 315 062 017 377         STA 017 "377     / P2 PB IMAGE (UP)
00 320 311                 RET
                       /
                       /
                       /
                       /
                       /
00 321 041 245 340 P1ADJ,  LXI HL 245 "340 / CHECK FIRST MOVE FOR
00 324 176                 LA M             / BACKUP ARROW.  IF THERE,
00 325 376 010             CPI 010          / REPLACE W. PROPER WALL
00 327 300                 RFZ              / CHARACTER
00 330 066 001             LMI 001
00 332 311                 RET
                       /
00 333 041 332 342 P2ADJ,  LXI HL 332 "342
00 336 176                 LA M
00 337 376 016             CPI 016
00 341 300                 RFZ
00 342 066 001             LMI 001
00 344 311                 RET
                       /
                           PAGE
                       /
                       /
                       /    UTILITY SUBROUTINES
                       /
                       /
                       /
00 345 325         B1UP,   PSHX DE          / UPDATES H,L
00 346 021 340 377         LXI DE 340 "377
00 351 031                 DADX DE
00 352 321                 POPX DE
00 353 311                 RET
00 354 325         B1DN,   PSHX DE
00 355 021 040 000         LXI DE 040 "000
00 360 031                 DADX DE
00 361 321                 POPX DE
00 362 311                 RET
00 363 054         B1RT,   INL
00 364 311                 RET
                       /
00 365 170         DIREC,  LA B             / CALL W. DIREC IN B
00 366 376 000             CPI 000
00 370 312 345 000         JTZ B1UP
00 373 376 001             CPI 001
00 375 312 363 000         JTZ B1RT
01 000 376 002             CPI 002
01 002 312 354 000         JTZ B1DN
01 005 055                 DCL              / ONE LEFT
01 006 311                 RET
                       /
01 007 333 001     COIN,   INP 001
01 011 027                 RAL
01 012 322 006 000         JFC START
01 015 311                 RET
                       /
01 016 076 200     DCOIN,  LAI 200          / RESET COIN FLIPFLOP
```

APPENDIX I  TWO-PLAYER GAME - Continued

```
01 020 323 001            OUT 001
01 022 076 000            LAI 000
01 024 323 001·           OUT 001
01 026 311                RET
                          PAGE
                /
                /
                /
                /   MOVE REQUIRES DIREC IN B REG.,
                /   PLAYER NO. IN C REG.
                /   (010=P1, 014=#2)
                /   H,L AT PROPER COORD.
                /   RETURNS WITH H,L UPDATED, B,C UNCHANGED
                /   D WIPED OUT
                /
01 027 126         MOVE,  LD M          / GET CURRENC CHR
01 030 172                LA D          / (CURRENT DIREC = 2LSB)
01 031 027                RAL           / CONSTRUCT TABLE ADDR:
01 032 027                RAL           / B7-B4 = 0
01 033 346 014            NDI 014       / B3, B2 = OLD DIREC
01 035 260                OR B          / B1, B0 = NEW DIREC
01 036 345                PSHX HL
01 037 041 351 003        LXI HL TABLE
01 042 205                AD L
01 043 157                LL A
01 044 176                LA M          / GET "LEAVE BEHIND" CHR.
01 045 341                POPX HL
01 046 315 073 001        CAL ARADJ
01 051 167                LM A          / WRITE IT
01 052 315 365 000        CAL DIREC     / MOVE PTR
01 055 176                LA M          / NEXT SPACE
01 056 376 032            CPI 032       / SPACE CHR?
01 060 302 070 001        JFZ EXIT      / NO - GET OUT
01 063 170                LA B          / YES - WRITE NEXT CHR
01 064 201                AD C          / C = WHICH PLAYER
01 065 167                LM A
01 066 257                XR A          / A=0 MEANS GOOD MOVE
01 067 311                RET
                /
01 070 076 001     EXIT,  LAI 001       / A=1 MEANS CRASH
01 072 311                RET
                /
                /
                /
                /   ADJUST ARROW IF BACKUP CHAR FOR PLAYER 2
                /
                /
01 073 376 006     ARADJ, CPI 006
01 075 370                RTS
01 076 137                LE A
01 077 171                LA C
01 100 376 014            CPI 014
01 102 332 111 001        JTC CORCT
01 105 173                LA E
01 106 306 004            ADI 004
01 110 311                RET
01 111 173         CORCT, LA E
01 112 311                RET
                /
                /
                /
                /   MOVE PLAYER 1 ONE SPACE
                /
01 113 052 000 377 P1MOVE,LDHL 000 377  / GET P1 COORD
01 116 016 010            LCI 010       / SET C = P1
01 120 072 004 377        LDA 004 377   / GET DIREC
01 123 107                LB A
```

APPENDIX I TWO-PLAYER GAME - Continued

```
01 124 315 027 001            CAL MOVE
01 127 042 000 377            STHL 000 ⊢377      / UPDATE P1 COORD
01 132 311                    RET
                       /
01 133 052 002 377  P2MOVE,   LDHL 002 ⊢377      / GET P2 COORD
01 136 016 014                LCI 014
01 140 072 005 377            LDA 005 ⊢377       / GET DIREC.
01 143 107                    LB A
01 144 315 027 001            CAL MOVE
01 147 042 002 377            STHL 002 ⊢377
01 152 311                    RET
                       /
                       /
                       /
                       /   PBCHECK READS THE PUSHBUTTONS, AND UPDATES THE P. 37
                       /   DIRECTION REGISTERS IF A PUSH IS DETECTED.
                       /
01 153 333 002      PBCK,     INP 002
01 155 346 017                NDI 017            / CHECK P1 FIRST
01 157 376 017                CPI 017
01 161 312 206 001            JTZ TICK1
01 164 062 016 377            STA 016 ⊢377       / UPDATE P1 IMAGE
01 167 000                    NOP
01 170 333 002      CHKP2,    INP 002            / NOW P2
01 172 346 360                NDI 360
01 174 376 360                CPI 360
01 176 312 213 001            JTZ TICK2
01 201 062 017 377            STA 017 ⊢377       / UPDATE P2 IMAGE
01 204 000                    NOP
01 205 311          CK2RET,   RET
                       /
                       /
01 206 366 000      TICK1,    ORI 000
01 210 303 170 001            JMP CHKP2
01 213 366 000      TICK2,    ORI 000
01 215 303 205 001            JMP CK2RET
                       /
                       /   DELAY1 IS USED BETWEEN MOVES
                       /
                       /
01 220 021 377 007  DELAY1,   LXI D 377 ⊢007     / DELAY CONSTANT
01 223 170                    LA B               / CALCULATE TONE PITCH
01 224 201                    AD C               / BY DIREC (B) AND PLAYER (C)
01 225 067                    SETC
01 226 027                    RAL
01 227 027                    RAL
01 230 027                    RAL
01 231 323 002                OUT 002            / TONE ON
01 233 315 153 001  D1,       CAL PBCK
01 236 033                    DCX DE
01 237 172                    LA D
01 240 376 004                CPI 004
01 242 314 277 001            CTZ OFF            / TURN OFF TONE
01 245 376 000                CPI 000
01 247 302 233 001            JFZ D1
01 252 072 016 377            LDA 016 ⊢377       / GET P1 PB IMAGE
01 255 315 037 002            CAL BIN
01 260 062 004 377            STA 004 ⊢377       / UPDATE P2 DIREC
01 263 072 017 377            LDA 017 ⊢377       / GET P2 PB IMAGE
01 266 366 017                ORI 017            / SET 4 MSB FOR "BIN"
01 270 315 037 002            CAL BIN
01 273 062 005 377            STA 005 ⊢377       / UPDATE P2 DIREC
01 276 311                    RET
                       /
                       /
01 277 076 377      OFF,      LAI 377
01 301 323 002                OUT 002
01 303 311                    RET
                       /
```

APPENDIX I TWO-PLAYER GAME - Continued

```
          /
          /
          /  PAGE
          /
          /
          /
          /  DELAY2 IS USED BETWEEN MOVES OF ADV.
          /  GAME.  THE BEEPS ARE OFF, AND THE COIN
          /  SWITCH IS MONITORED
          /
01 304 325              DELAY2,  PSHX DE
01 305 021 377 020               LXI DE 377 "020
01 310 315 007 001 D2,           CAL COIN
01 313 033                       DCX DE
01 314 172                       LA D
01 315 376 010                   CPI 010
01 317 302 310 001               JFZ D2
01 322 321                       POPX DE
01 323 311                       RET
          /
          /
          /
          /  RNDGTN SIMULATES A PUSHBUTTON INPUT USING A RANDOM
          /  NUMBER GENERATOR.
          /
01 324 072 004 377 RNDGT1,  LDA 004 "377    / GET CURRENT DIREC.
01 327 107                  LB A
01 330 315 007 002          CAL RND
01 333 200                  AD B
01 334 107                  LB A
01 335 052 000 377          LDHL 000 "377
01 340 315 036 003          CAL LEGAL
01 343 170                  LA B
01 344 062 004 377          STA 004 "377
01 347 311                  RET
01 350 072 005 377 RNDGT2,  LDA 005 "377
01 353 107                  LB A
01 354 315 007 002          CAL RND
01 357 200                  AD B
01 360 107                  LB A
01 361 052 002 377          LDHL 002 "377
01 364 315 036 003          CAL LEGAL
01 367 170                  LA B
01 370 062 005 377          STA 005 "377
01 373 311                  RET
01 374 346 007     BIAS,    NDI 007
01 376 376 001              CPI 001
02 000 310                  RTZ
02 001 376 003              CPI 003
02 003 310                  RTZ
02 004 076 000              LAI 000
02 006 311                  RET
          /
          /
          /
02 007 345         RND,     PSHX HL
02 010 052 012 377          LDHL 012 "377    / GET RND POLY
02 013 175                  LA L
02 014 037                  RAR
02 015 037                  RAR
02 016 037                  RAR
02 017 254                  XR H
02 020 027                  RAL
02 021 174                  LA H
02 022 037                  RAR
02 023 147                  LH A
02 024 175                  LA L
02 025 037                  RAR
```

APPENDIX I  TWO-PLAYER GAME - Continued

```
02 026 157                      LL  A
02 027 042 012 377              STHL 012 #377
02 032 315 374 001              CAL BIAS
02 035 341                       POPX HL
02 036 311                      RET
                        /
                        /   BIN(ARY) IS ENTERED WITH A = 1111XXXX (P1)
                        /   OR A = XXXX1111 (P2)
                        /
                        /
02 037 325          BIN,        PSHX DE
02 040 026 000              LDI 000
02 042 037          LP,         RAR             / LOOK FOR A ZERO
02 043 322 052 002          JFC OUTGO
02 046 024                  IND
02 047 303 042 002          JMP LP
02 052 172          OUTGO,  LA  D
02 053 346 003              NDI 003             / MASK 2 LSB IN CASE IT WAS P2
02 055 107                  LB  A               / AND D GOT BEYOND 003
02 056 321                  POPX DE
02 057 311                  RET
                        /
                        /
                        /
                        /       PAGE
                        /
                        /
                        /   HIT UPDATES SCORE AND
                        /   CHECKS FOR END OF GAME
                        /
                        /
02 060 072 014 377  HIT,    LDA 014 #377        / GAME?
02 063 346 001              NDI 001
02 065 312 077 002          JTZ BOOM            / YES
02 070 333 001              INP 001             / NO: CHECK JUMPER
02 072 346 004              NDI 004
02 074 312 113 002          JTZ NOBOOM
02 077 323 004      BOOM,   OUT 004
02 101 036 000              LEI 000             / 1 MS DELAY
02 103 074          BLD,    INA
02 104 376 200              CPI 200
02 106 302 103 002          JFZ BLD
02 111 323 010              OUT 010             / BOOM OFF
02 113 325          NOBOOM, PSHX DE
02 114 345                  PSHX HL
02 115 171                  LA  C
02 116 376 010              CPI 010             / WHICH PLAYER HIT?
02 120 312 131 002          JTZ P2
02 123 041 007 377  P1,     LXI HL 007 #377     / IT WAS P2 - INCR P1 SCORE
02 126 303 134 002          JMP RES1
02 131 041 010 377  P2,     LXI HL 010 #377     / IT WAS P1 - INCR P2 SCORE
02 134 064          RES1,   INM                 / RESUME (INCR SCORE)
02 135 315 002 003          CAL DISPL           / PUT UP SCORE
                        /
                        /
                        /
                        /   NOW A LONG DELAY SO PLAYERS CAN
                        /   INSPECT THE DAMAGE
                        /
                        /
02 140 021 000 000          LXI DE 000 #000     / OUTER COUNTER
02 143 041 000 000  INER,   LXI HL 000 #000     / INNER COUNTER
02 146 043          DEL1,   INX HL
02 147 174                  LA  H
02 150 376 020              CPI 020
02 152 302 146 002          JFZ DEL1            / FLASH INTERVAL
02 155 303 242 002          JMP FLASH
02 160 023          FLRET,  INX DE              / FLASH RETURN
02 161 173                  LA  E
02 162 376 100              CPI 100
```

APPENDIX I  TWO-PLAYER GAME - Continued

```
02 164 302 143 002            JFZ INER
02 167 021 000 000            LXI DE 000 "000    / PUT SCORE BACK AND STOP FLASHING
02 172 315 002 003            CAL DISPL
02 175 023          LPX,      INX DE
02 176 172                    LA D
02 177 376 377                CPI 377
02 201 302 175 002            JFZ LPX
02 204 041 011 377            LXI HL 011 "377    / CHECK FOR END SCORE
02 207 072 007 377            LDA 007 "377       / GET P1 SCORE
02 212 276                    CP M
02 213 312 366 002            JTZ ENDGM
02 216 072 010 377            LDA 010 "377       / P2 SCORE
02 221 276                    CP M
02 222 312 366 002            JTZ ENDGM
02 225 321                    POPX DE            / READY TO GET OUT
02 226 341                    POPX HL
02 227 072 014 377            LDA 014 "377
02 232 376 000                CPI 000
02 234 312 063 000            JTZ PLAY
02 237 303 141 000            JMP ADPLAY
                            /
                            /
                              PAGE
                            /
                            /
02 242 343          FLASH,    SP<>HL             / TOP OF STACK=BLOW UP POS.
02 243 176                    LA M               / GET IT
02 244 376 032                CPI 032            / IS IT BLANK?
02 246 312 256 002            JTZ BU             / YES: WRITE B-U CHAR
02 251 066 032                LMI 032            / NO:  WRITE BLANK
02 253 303 260 002            JMP SCR
02 256 066 033      BU,       LMI 033
02 260 343          SCR,      SP<>HL             / SCORE FLASH (PUT H,L BACK)
02 261 345                    PSHX HL
02 262 171                    LA C               / WHICH SCORE
02 263 376 010                CPI 010
02 265 312 302 002            JTZ XP2            / P1 HIT; LASH P2
02 270 041 245 340            LXI HL 245 "340    / P1 COORD
02 273 072 007 377            LDA 007 "377       / GET P1 SCORE
02 276 127                    LD A
02 277 303 311 002            JMP GOON
02 302 041 332 342  XP2,      LXI HL 332 "342    / P2 COORD
02 305 072 010 377            LDA 010 "377       / P2 SCORE
02 310 127                    LD A
02 311 176          GOON,     LA M               / RESUME
02 312 376 032                CPI 032            / BLANK?
02 314 312 324 002            JTZ BLK1
02 317 066 032                LMI 032            / NO - PUT BLANK
02 321 303 330 002            JMP EXIT2
02 324 172          BLK1,     LA D               / YES: PUT SCORE BACK
02 325 306 020                ADI 020
02 327 167                    LM A
02 330 341          EXIT2,    POPX HL
02 331 303 160 002            JMP FLRET
                            /
                            /
                              PAGE
02 334 315 251 000  MESGE,    CAL INIT
02 337 041 217 341            LXI HL 217 "341
02 342 066 006                LMI 006
02 344 054                    INL
02 345 066 007                LMI 007
02 347 054                    INL
02 350 066 034                LMI 034
02 352 041 257 341            LXI HL 257 "341
02 355 066 035                LMI 035
02 357 054                    INL
02 360 066 036                LMI 036
02 362 054                    INL
02 363 066 037                LMI 037
```

APPENDIX I  TWO-PLAYER GAME - Continued

```
02 365 311                             RET
            /
02 366 315 334 002    ENDGM,   CAL MESGE
02 371 315 171 003             CAL ENDSKR
02 374 315 237 000             CAL HUGDEL        / START COIN CHECK
02 377 303 006 000             JMP START
            /
            /
03 002 041 304 340    DISPL,   LXI HL 304 ʜ340   / DISPLAY BOTH SCORES
03 005 315 130 003             CAL BLKOUT
03 010 041 371 342             LXI HL 371 ʜ342
03 013 315 130 003             CAL BLKOUT
03 016 072 010 377             LDA 010 ʜ377      / GET P2 SCORE (H,L AT RIGHT
03 021 306 020                 ADI 020           / COORD FROM BLKOUT).
03 023 167                     LM A
03 024 041 245 340             LXI HL 245 ʜ340
03 027 072 007 377             LDA 007 ʜ377
03 032 306 020                 ADI 020
03 034 167                     LM A
03 035 311 .                   RET
            /
                               PAGE
            /

/
            /
            /    LEGAL CHECKS THE DIREC IN B ( USING COORD. IN H,L)
            /    FOR LEGAL MOVE.  IF OK, RETURNS WITH B UNCHANGED.
            /    IF NOT OK, AND THERE IS A POSSIBLE OTHER MOVE, RETURNS
            /    WITH B=OK MOVE.  IF NO POSSIBLE MOVE, RETURNS WITH
            /    B UNCHANGED.
            /
03 036 315 077 003    LEGAL,   CAL TRYIT
03 041 376 032                 CPI 032
03 043 310                     RTZ               / MOVE OK
03 044 005                     DCB               / HANG A LEFT
03 045 315 077 003             CAL TRYIT
03 050 376 032                 CPI 032
03 052 310                     RTZ
03 053 005                     DCB               / ANOTHER LEFT
03 054 315 077 003             CAL TRYIT
03 057 376 032                 CPI 032
03 061 310                     RTZ
03 062 005                     DCB               / ANOTHER
03 063 315 077 003             CAL TRYIT
03 066 376 032                 CPI 032
03 070 310                     RTZ
03 071 005                     DCB
03 072 170                     LA B
03 073 346 003                 NDI 003
03 075 107                     LB A
03 076 311                     RET
03 077 170             TRYIT,  LA B              / B=DIREC. TO TRY (UNMASKED)
03 100 346 003                 NDI 003
03 102 107                     LB A
03 103 315 365 000             CAL DIREC
03 106 126                     LD M
03 107 315 114 003             CAL HLRES
03 112 172                     LA D
03 113 311 .                   RET
03 114 130             HLRES,  LE B              / PUT H,L BACK
03 115 170                     LA B              / PRESERVE B
03 116 306 002                 ADI 002           / DO 180
03 120 346 00                  NDI 003
03 122 107                     LB A
03 123 315 365 000             CAL DIREC
03 126 103                     LB E
03 127 311                     RET
                               PAGE
```

APPENDIX I  TWO-PLAYER GAME - Continued

```
                        /
                       /
                      /
                     /    BLKOUT NEEDS BEGINNING COORD IN H,L
                    /
                   /
03 130 325          BLKOUT, PSHX DE
03 131 021 340 377          LXI DE 340 ɴ377  / UP CONSTANT
03 134 066 032              LMI 032
03 136 054                  INL
03 137 066 032              LMI 032
03 141 054                  INL
03 142 066 032              LMI 032
03 144 031                  DADX DE
03 145 066 032              LMI 032
03 147 031                  DADX DE
03 150 066 032              LMI 032
03 152 055                  DCL
03 153 066 032              LMI 032
03 155 055                  DCL
03 156 066 032              LMI 032
03 160 021 040 000          LXI DE 040 ɴ000  / DN CONSTANT
03 163 031                  DADX DE
03 164 066 032              LMI 032
03 166 054                  INL
03 167 321                  POPX DE
03 170 311                  RET
03 171 041 255 341  ENDSKR, LXI HL 255 ɴ341
03 174 072 007 377          LDA 007 ɴ377
03 177 306 020              ADI 020
03 201 167                  LM A
03 202 041 263 341          LXI HL 263 ɴ341
03 205 072 010 377          LDA 010 ɴ377
03 210 306 020              ADI 020
03 212 167                  LM A
03 213 311                  RET
                            PAGE
                    /
                   /
                  /
                 /   DRAW BOUNDARIES
                /
03 214 041 000 340  BDY,    LXI HL 000 ɴ340  / CLR SCREEN
03 217 066 032      BDY1,   LMI 032          / BLK CHR.
03 221 043                  INX HL
03 222 174                  LA H
03 223 376 344              CPI 344
03 225 302 217 003          JFZ BDY1
03 230 041 000 340          LXI HL 000 ɴ340
03 233 066 000      TOPMG,  LMI 000          / TOP BDY.
03 235 054                  INL
03 236 175                  LA L
03 237 376 040              CPI 040
03 241 302 233 003          JFZ TOPMG
03 244 041 140 343          LXI HL 140 ɴ343
03 247 066 000      BOTMG,  LMI 000
03 251 054                  INL
03 252 175                  LA L
03 253 376 200              CPI 200
03 255 302 247 003          JFZ BOTMG
03 260 041 000 340          LXI HL 000 ɴ340
03 263 066 001      LFTMG,  LMI 001
03 265 021 040 000          LXI DE 040 ɴ000
03 270 031                  DADX DE
03 271 174                  LA H
03 272 376 344              CPI 344
03 274 302 263 003          JFZ LFTMG
03 277 041 037 340          LXI HL 037 ɴ340
03 302 066 001      RTMG,   LMI 001
03 304 031                  DADX DE
```

APPENDIX I TWO-PLAYER GAME - Continued

```
03 305 174              LA H
03 306 376 344          CPI 344
03 310 302 302 003      JFZ RTMG
03 313 041 000 340      LXI HL 000 *340
03 316 066 002          LMI 002            / UPPER LEFT CORNER
03 320 041 037 340      LXI HL 037 *340
03 323 066 003          LMI 003            / UPPER RIGHT CORNER
03 325 041 140 343      LXI HL 140 *343
03 330 066 004          LMI 004            / LOWER LEFT CORNER
03 332 041 177 343      LXI HL 177 *343
03 335 066 005          LMI 005            / LOWER RIGHT CORNER
03 337 041 020 340      LXI HL 020 *340
03 342 072 011 377      LDA 011 *377       / GET ENDING SCORE
03 345 306 020          ADI 020
03 347 167              LM A               / PUT IT WHERE JERRY CAN SEE IT
03 350 311              RET
                /
                        PAGE
              /
             /
            /
           /
          /
         /
        /
       /
      /
03 351 001      TABLE,  #001               / UP-UP
03 352 002              #002               / UP-RT
03 353 012              #012               / UP-DN
03 354 003              #003               / UP-LFT
03 355 005              #005              / RT-UP
03 356 000              #000               / UP-UP
03 357 003              #003               / UP-LFT
03 360 013              #013               / RT-LFT
03 361 010              #010               / DN-UP
03 362 004              #004               / LFT-UP
03 363 001              #001               / DN-DN
03 364 005              #005               / RT-UP
03 365 004              #004               / DN-RT
03 366 011              #011               / LFT-DN
03 367 002              #002               / LFT-DN
03 370 000              #000               / RT-RT
                /
               /
SUNRAY  0 000 056 000           $
PLAY    0 000 063 000
P1FIRS  0 000 102 000
P2FIRS  0 000 120 000
ADPLAY  0 000 141 000
ADAGN   0 000 162 000
BIGDEL  0 000 221 000
BGD     0 000 224 000
HUGDEL  0 000 237 000
HDL     0 000 241 000
INIT    0 000 251 000
P1ADJ   0 000 321 000
P2ADJ   0 000 333 000
B1UP    0 000 345 000
B1DN    0 000 354 000
B1RT    0 000 363 000
DIREC   0 000 365 000
COIN    0 000 007 001
DCOIN   0 000 016 001
MOVE    0 000 027 001
EXIT    0 000 070 001
ARADJ   0 000 073 001
CORCT   0 000 111 001
P1MOVE  0 000 113 001
```

APPENDIX I  TWO-PLAYER GAME - Continued

```
P2MOVE  0  000  133  001
PBCK    0  000  153  001
CHKP2   0  000  170  001
CK2RET  0  000  205  001
TICK1   0  000  206  001
TICK2   0  000  213  001
DELAY1  0  000  220  001
D1      0  000  233  001
OFF     0  000  277  001
DELAY2  0  000  304  001
D2      0  000  310  001
RNDGT1  0  000  324  001
RNDGT2  0  000  350  001
BIAS    0  000  374  001
RND     0  000  007  002
BIN     0  000  037  002
LP      0  000  042  002
OUTGO   0  000  052  002
HIT     0  000  060  002
BOOM    0  000  077  002
BLD     0  000  103  002
NOBOOM  0  000  113  002
P1      0  000  123  002
P2      0  000  131  002
RES1    0  000  134  002
INER    0  000  143  002
DEL1    0  000  146  002
FLRET   0  000  160  002
LPX     0  000  175  002
FLASH   0  000  242  002
BU      0  000  256  002
SCR     0  000  260  002
XP2     0  000  302  002
GOON    0  000  311  002
BLK1    0  000  324  002
EXIT2   0  000  330  002
MESGE   0  000  334  002
ENDGM   0  000  366  002
DISPL   0  000  002  003
LEGAL   0  000  036  003
TRYIT   0  000  077  003
HLRES   0  000  114  003
BLKOUT  0  000  130  003
ENDSKR  0  000  171  003
BDY     0  000  214  003
BDY1    0  000  217  003
TOPMG   0  000  233  003
BOTMG   0  000  247  003
LFTMG   0  000  263  003
RTMG    0  000  302  003
TABLE   0  000  351  003
```

APPENDIX II  FOUR-PLAYER GAME

INTERFACE PIN ASSIGNMENTS:

```
1   P3 UP
2   P3 RIGHT
3   KEY
4   P3 DOWN
5   P3 LEFT
6   GND
7   P4 UP
```

APPENDIX II  FOUR-PLAYER GAME -Continued

```
/    8    P4 RIGHT
/    9    P4 DOWN
/   10    P4 LEFT
/
/   21    P1 UP
/   22    P1 RIGHT
/   23    P1 DOWN
/   24    P1 LEFT
/   25    GND
/   26    P2 UP
/   27    KEY
/   28    P2 RIGHT
/   29    P2 DOWN
/   30    P2 LEFT
/
/   31    BOOM OFF (L)
/   32    3 ARROWS (L)
/   33    START PUSHBUTTON
/   34    GND
/   35
/   36
/   37    COIN SWITCH N.O.
/   38    GND (COIN SWITCH COM)
/   39    KEY
/   40    COIN SWITCH N.C.
/
/  NOTE:  ALL DIRECTIONS REF. BOTTOM OF SCREEN.
/
/
PAGE
/   P. 377  ASSIGNMENTS
/
/
/   0,1  P1 POSITION
/   2,3  P2 POSITION
/   4,5  P3 POSITION
/   6,7  P4 POSITION
/
/   10   P1 DIRECTION
/   11   P2 DIRECTION
/   12   P3 DIRECTION
/   13   P4 DIRECTION
/
/   14 ADVERTISING FLAG 0=GAME;1=ADVERT.
/   15,16         RND NUMBER POLYNOMIAL
/
/   20   P1 ERAD FLAG    0=LEAVE ALONE
/   21   P2              1=ERADICATE
/   22   P3              USED BY ERAD, HIT
/   23   P4
/
/   24   P1 PUSHBUTTON IMAGE
/   25   P2
/   26   P3
/   27   P4
/
/   30   NO. PLAYERS OUT OF ROUND
/   31   NO. PLAYERS OUT OF GAME
/
/   32   P1 OUT OF GAME LIST
/   3    P2 0=IN;  1=OUT
/   34   P3
/   35   P4
/
/   36   P1 OUT OF ROUND LIST
/   37   P2 0=IN;  1=OUT
/   40   P3
/   41   P4
/   42   COIN COUNTER
/
/
    PAGE
```

APPENDIX II  FOUR-PLAYER GAME - Continued

```
00 000 061 200 377 ORIGIN, LXI SP 200 "377
00 003 315 216 101         CAL DCOIN
00 006 041 020 377         LXI HL 020 "377
00 011 066 000     ST1,    LMI 000
00 013 054                 INL
00 014 175                 LA L
00 015 376 042      0      CPI 042
00 017 302 011 100         JFZ ST1
00 022 076 377             LAI 377
00 024 323 002             OUT 002         / TONE OFF
00 026 323 010             OUT 010         / BOOM OFF
00 030 062 015 377         STA 015 "377    / RND SEED
 0 033 315 030 107         CAL BDY
00 036 315 351 100         CAL JUMPER
00 041 041 000 300         LXI HL 000 "300 / 100 MS DELAY
00 044 315 172 104         CAL BGD
00 047 333 001             INP 001         / COIN (STILL)HERE?
00 051 027                 RAL
00 052 322 071 100         JFC COINHR      / YES-PLAY GAME
00 055 076 001             LAI 001         / NO - PWR ON - ADVERTISE
00 057 062 014 377         STA 014 "377
00 062 257                 XR A
00 063 062 042 377         STA 042 "377    / CLR COIN CTR
00 066 303 177 100         JMP NEWRND
00 071 072 042 377 COINHR, LDA 042 "377    / INCR. COIN COUNTER
00 074 074                 INA
00 075 062 042 377         STA 042 "377
00 100 376 001             CPI 001
00 102 312 116 100         JTZ ZPLSET      / ONE COIN: 2 PLAYERS
00 105 315 030 107         CAL BDY
00 110 315 351 100         CAL JUMPER
00 113 303 153 100         JMP STARTC
00 116 315 245 105 ZPLSET, CAL DCRP2       / SET UP FOR TWO
00 121 315 245 105         CAL DCRP2
00 124 315 245 105         CAL DCRP2
00 127 315 245 105         CAL DCRP2
00 132 315 355 105         CAL DCRP4
00 135 315 355 105         CAL DCRP4
00 140 315 355 105         CAL DCRP4
00 143 315 355 105         CAL DCRP4
00 146 076 002             LAI 002
00 150 062 030 377         STA 030 "377
00 153 315 263 106 STARTC, CAL MESGE
00 156 333 001             INP 001         / MONITOR START PUSHBUTTON
00 160 346 020             NDI 020         / BIT 4 (PIN 33)
00 162 302 153 100         JFZ STARTC      / #1
00 165 315 114 101         CAL INIT2       / CLEAR MESSAGE
00 170 257                 XR A
00 171 062 014 377         STA 014 "377    / SET ADV FLAG = 0 (GAME)
00 174 062 042 377         STA 042 "377    / CLR COIN CTR
                   /
                           PAGE
00 177 315 373 100 NEWRND, CAL INIT
00 202 041 036 377         LXI HL 036 "377 / CLEAR OUT OF ROUND FLAGS
00 205 066 000     NWR,    LMI 000
00 207 054                 INL
00 210 175                 LA L
00 211 376 042             CPI 042
00 213 302 205 100         JFZ NWR
                   /
                   /
00 216 072 032 377 PONE,   LDA 032 "377
00 221 376 000             CPI 000
00 223 302 244 100         JFZ PTWO
00 226 072 036 377         LDA 036 "377
00 231 376 000             CPI 000
00 233 302 244 100         JFZ PTWO
00 236 315 151 102         CAL DELAY1
00 241 315 340 101         CAL P1MOVE      / PNMOVE CHECKS FOR HIT
00 244 072 033 377 PTWO,   LDA 033 "377
00 247 376 000             CPI 000
```

APPENDIX II  FOUR-PLAYER GAME - Continued

```
00 251 302 272 100              JFZ PTHR
00 254 072 037 377              LDA 037 ,377
00 257 376 000                  CPI 000
00 261 302 272 100              JFZ PTHR
00 264 315 151 102              CAL DELAY1
00 267 315 376 101              CAL P2MOVE
00 272 072 034 377     PTHR,    LDA 034 ,377
00 275 376 000                  CPI 000
00 277 302 320 100              JFZ PFOR
00 302 072 040 377              LDA 040 ,377
00 305 376 000                  CPI 000
00 307 302 320 100              JFZ PFOR
00 312 315 151 102              CAL DELAY1
00 315 315 034 102              CAL P3MOVE
00 320 072 035 377     PFOR,    LDA 035 ,377
00 323 376 000                  CPI 000
00 325 302 216 100              JFZ PONE
00 330 072 041 377              LDA 041 ,377
00 333 376 000                  CPI 000
00 335 302 216 100              JFZ PONE
00 340 315 151 102              CAL DELAY1
00 343 315 072 102              CAL P4MOVE
00 346 303 216 100              JMP PONE
                       /
00 351 333 001         JUMPER,  INP 001
00 353 346 010                  NDI 010
00 355 300                      RFZ             / HI
00 356 315 204 105              CAL DCRP1       / LO
00 361 315 245 105              CAL DCRP2
00 364 315 314 105              CAL DCRP3
00 367 315 355 105              CAL DCRP4
00 372 311                      RET
                       /
                                PAGE
                       /
00 373 072 014 377     INIT,    LDA 014 ,377
00 376 376 000                  CPI 000         / GAME?
01 000 304 263 106              CFZ MESGE       / NO
01 003 041 217 340              LXI HL 217 ,340 / P1 INIT POSITION
01 006 042 000 377              STHL 000 ,377   / STORE P. 377 LOC 011
01 011 066 052                  LMI 052         / P1 DN CHAR
01 013 076 002                  LAI 002
01 015 062 010 377              STA 010 ,377    / P1 INIT DIREC (DN)
                       /
01 020 041 273 341              LXI HL 273 ,341
01 023 042 002 377              STHL 002 ,377
01 026 066 113                  LMI 113
01 030 076 003                  LAI 003
01 032 062 011 377              STA 011 ,377
                       /
01 035 041 360 342              LXI HL 360 ,342
01 040 042 004 377              STHL 004 ,377
01 043 066 150                  LMI 150         / P3 UP CHAR
01 045 076 000                  LAI 000         / UP
01 047 062 012 377              STA 012 ,377
                       /
01 052 041 304 341              LXI HL 304 ,341
01 055 042 006 377              STHL 006 ,377
01 060 066 211                  LMI 211         / P4 RIGHT CHAR
01 062 076 001                  LAI 001
01 064 062 013 377              STA 013 ,377    / RT
                       /
01 067 076 373                  LAI 373         / P1 PUSHB. IMAGE
01 071 062 024 377              STA 024 ,377    / 11111011=DN
                       /
01 074 076 177                  LAI 177         / P2 PB IMAGE
01 076 062 025 377              STA 025 ,377    / 01111111=LFT
                       /
01 101 076 376                  LAI 376         / P3 PB IMAGE
01 103 062 026 377              STA 026 ,377    / 11111110=UP
                       /
01 106 076 337                  LAI 337         / P4 PB IMAGE
```

APPENDIX II FOUR-PLAYER GAME - Continued

```
01 110 062 027 377          STA 027 "377    / 11011111=RT
                        /
01 113 311                  RET
01 114 041 041 340 INIT2,   LXI HL 041 "340  / CLEAR SCREEN BUT NOT BOUNDARI:
01 117 066 006     LINE,    LMI 006
01 121 054                  INL
01 122 175                  LA L
01 123 346 037              NDI 037
01 125 376 037              CPI 037          / END OF LINE
01 127 302 117 101          JFZ LINE         / NO - GO AIAIN
01 132 174                  LA H             / YES:  END OF SCREEN?
01 133 376 343              CPI 343
01 135 302 144 101          JFZ NOTYET       / NO
01 140 175                  LA L             / CHECK END OF LINE P. 343
01 141 376 137              CPI 137
01 143 310                  RTZ
01 144 043         NOTYET,  INX HL
01 145 043                  INX HL
01 146 303 117 101          JMP LINE
                        /   UTILITY SUBROUTINES
                        /
                        /
                        /
01 151 325         B1UP,    PSHX DE          / UPDATES H,L
01 152 021 340 377          LXI DE 340 "377
01 155 031                  DADX DE
01 156 321                  POPX DE
01 157 311                  RET
01 160 325         B1DN,    PSHX DE
01 161 021 040 000          LXI DE 040 "000
01 164 031                  DADX DE
01 165 321                  POPX DE
01 166 311                  RET
01 167 054         B1RT,    INL
01 170 311                  RET
01 171 055         B1LFT,   DCL
01 172 311                  RET
                        /
01 173 170         DIREC,   LA B             / CALL W. DIREC IN B
01 174 376 000              CPI 000
01 176 312 151 101          JTZ B1UP
01 201 376 001              CPI 001
01 203 312 167 101          JTZ B1RT
01 206 376 002              CPI 002
01 210 312 160 101          JTZ B1DN
01 213 303 171 101          JMP B1LFT
                        /
                        /
                        /
01 216 076 200     DCOIN,   LAI 200
01 220 323 001              OUT 001
01 222 076 000              LAI 000
01 224 323 001              OUT 001
01 226 311  .               RET
                            PAGE

/   MOVE REQUIRES DIREC IN B REG.,
                        /   PLAYER NO. IN C REG.
                        /   (010=P1, 014=#2)
                        /   H,L AT PROPER COORD.
                        /   RETURNS WITH H,L UPDATED, B,C UNCHANGED
                        /   D WIPED OUT
                        /
                        /
01 227 176         MOVE,    LA M             / GET CURRENT CHR
01 230 027                  RAL              / CONSTRUCT TABLE ADDR:
01 231 027                  RAL              / B7-B4 = 0
01 232 346 014              NDI 014          / B3, B2 = OLD DIREC
01 234 260                  OR B             / B1, B0 = NEW DIREC
01 235 345                  PSHX HL
01 236 041 254 107          LXI HL TABLE
01 241 205                  AD L
```

APPENDIX II  FOUR-PLAYER GAME - Continued

```
01 242 157                     LL A
01 243 126                     LD M           / GET "LEAVE BEHIND" CHR. IN D
01 244 341                     POPX HL
01 245 315 300 101             CAL WHICHP     / WRITE IT
01 250 167                     LM A
01 251 315 173 101             CAL DIREC      / MOVE PTR
01 254 176                     LA M           / NEXT SPACE
01 255 376 006                 CPI 006        / SPACE CHR?
01 257 302 275 101             JFZ EXIT       / NO - GET OUT
01 262 076 010                 LAI 010
01 264 200                     AD B
01 265 127                     LD A
01 266 315 300 101             CAL WHICHP     / C - WHICH PLAYER
01 271 167                     LM A
01 272 076 000                 LAI 000        / A=000 MEANS GOOD MOVE
01 274 311                     RET
                       /
01 275 076 001     EXIT,       LAI 001        / A=1 MEANS CRASH
01 277 311                     RET
                       /
                       /   WHICHPLAYER TAKES CHAR. IN D REGISTER, DECIDES
                       /   WHICH PLAYER FROM C-REG, AND RETURNS WITH
                       /   PROPER CHAR. IN A-REG.
                       /
01 300 171         WHICHP,     LA C           / WHICH PLAYER?
01 301 376 010                 CPI 010
01 303 312 334 101             JTZ BP1
01 306 376 014                 CPI 014
01 310 312 330 101             JTZ BP2
01 313 376 020                 CPI 020
01 315 312 324 101             JTZ BP3
01 320 076 200     BP4,        LAI 200
01 322 202                     AD D
01 323 311                     RET
01 324 076 140     BP3,        LAI 140
01 326 202                     AD D
01 327 311                     RET
01 330 076 100     BP2,        LAI 100
01 332 202                     AD D
01 333 311                     RET
01 334 076 040     BP1,        LAI 040
01 336 202                     AD D
01 337 311                     RET
                       /   MOVE PLAYER 1 ONE SPACE
                       /
01 340 052 000 377 P1MOVE,     LDHL 000 *377  / GET P1 COORD
01 343 016 010                 LCI 010        / SET C = P1
01 345 072 010 377             LDA 010 *377   / GET DIREC
01 350 107                     LB A
01 351 315 227 101             CAL MOVE
01 354 042 000 377             STHL 000 *377  / UPDATE P1 COORD
01 357 376 001                 CPI 001
01 361 312 317 103             JTZ HIT
01 364 041 217 340             LXI HL 217 *340
01 367 176                     LA M           / ADJ. FOR BACKUP ARROW
01 370 376 050                 CPI 050
01 372 300                     RFZ
01 373 066 045                 LMI 045
01 375 311                     RET
01 376 052 002 377 P2MOVE,     LDHL 002 *377  / GET P2 COORD
02 001 016 014                 LCI 014
02 003 072 011 377             LDA 011 *377   / GET DIREC.
02 006 107                     LB A
02 007 315 227 101             CAL MOVE
02 012 042 002 377             STHL 002 *377
02 015 376 001                 CPI 001
02 017 312 317 103             JTZ HIT
02 022 041 273 341             LXI HL 273 *341
02 025 176                     LA M
02 026 376 111                 CPI 111
02 030 300                     RFZ
```

APPENDIX II  FOUR-PLAYER GAME - Continued

```
02 031 066 104              LMI 104
02 033 311                  RET
02 034 052 004 377  P3MOVE, LDHL 004 "377    / P3 COORD INTO H,L
02 037 016 020              LCI 020          / P3
02 041 072 012 377          LDA 012 "377
02 044 107                  LB A
02 045 315 227 101          CAL MOVE
02 050 042 004 377          STHL 004 "377
02 053 376 001              CPI 001
02 055 312 317 103          JTZ HIT
02 060 041 36 0 342          LXI HL 360 "342
02 063 176                  LA M
02 064 376 152              CPI 152
02 066 300                  RFZ
02 067 066 145              LMI 145
02 071 311                  RET
02 072 052 006 377  P4MOVE, LDHL 006 "377
02 075 016024               LCI 024
02 077 072 013 377          LDA 013 "377
02 102 107                  LB A
02 103 315 227 101          CAL MOVE
02 106 042 006 377          STHL 006 "377
02 111 376 001              CPI 001
02 113 312 317 103          JTZ HIT
02 116 041 304 341          LXI HL 304 "341
02 121 176                  LA M
02 122 376 213              CPI 213
02 124 300                  RFZ
02 125 066 204              LMI 204
02 127 311                  RET

/       BIN(ARY) IS ENTERED WITH A = 1111XXXX (P1)
                    /       OR A = XXXX1111 (P2)
                    /
                    /
02 130 325          BIN,    PSHX DE
02 131 026 000              LDI 000
02 133 037         LP,      RAR              / LOOK FOR A ZERO
02 134 322 143 102          JFC OUTGO
02 137 024                  IND
02 140 303 133 102          JMP LP
02 143 172         OUTGO,   LA D
02 144 346 003              NDI 003          / MASK 2 LSB IN CASE IT WAS P2
02 146 107                  LB A             / AND D GOT BEYOND 003
02 147 321                  POPX DE
02 150 311                  RET
02 151 072 014 377  DELAY1, LDA 014 "377     / GAME OR ADV?
02 154 376 000              CPI 000
02 156 302 264 102          JFZ ADVDEL
02 161 021 377 004          LXI DE 377 "004  / GAME DELAY
02 164 170                  LA B             / CALC. TONE PITCH
02 165 201                  AD C
02 166 067                  SETC
02 167 027                  RAL
02 170 027                  RAL
02 171 027                  RAL
02 172 323 002              OUT 002
02 174 315 307 102  D1,     CAL PBCK
02 177 033                  DCX DE
02 200 172                  LA D
02 201 376 002              CPI 002
02 203 314 302 102          CTZ OFF
02 206 376 000              CPI 000
02 210 302 174 102          JFZ D1
02 213 072 024 377          LDA 024 "377     / GET P1 PB IMAGE
02 216 315 130 102          CAL BIN
02 221 062 010 377          STA 010 "377     / UP DATE P1 DIREC.
02 224 072 025 377          LDA 025 "377     / P2
02 227 366 017              ORI 017
02 231 315 130 102          CAL BIN
02 234 062 011 377          STA 011 "377
02 237 072 026 377          LDA 026 "377
```

APPENDIX II  FOUR-PLAYER GAME - Continued

```
02 242 315 130 102          CAL BIN
02 245 062 012 377          STA 012 ",377
02 250 072 027 377          LDA 027 ",377
02 253 366 017              ORI 017
02 255 315 130 102          CAL BIN
02 260 062 013 377          STA 013 "377
02 263 311                  RET
02 264 021 377 006  ADVDEL, LXI DE 377 "006  / FASTER PLAY
02 267 033          D2,     DCX DE
02 270 172                  LA D
02 271 376 000              CPI 000
02 273 302 267 102          JFZ D2
02 276 315 020 103          CAL RNDGT
02 301 311                  RET
                    /
02 302 076 377      OFF,    LAI 377
02 304 323 002              OUT 002
02 306 311                  RET
02 307 333 002      PBCK,   INP 002
02 311 346 017              NDI 017
02 313 376 017              CPI 017
02 315 312 374 102          JTZ TICK1
02 320 062 024 377          STA 024 ,377
02 323 000                  NOP
02 324 333 002      CHKP2,  INP 002
02 326 346 360              NDI 360
02 330 376 360              CPI 360
02 332 312 001 103          JTZ TICK2
02 335 062 025 377          STA 025 "377
02 340 000                  NOP
02 341 333 004      CHKP3,  INP 004
02 343 346 017              NDI 017
02 345 376 017              CPI 017
02 347 312 006 103          JTZ TICK3
02 352 062 026 377          STA 026  377
02 355 000                  NOP
02 356 333 004      CHKP4,  INP 004
02 360 346 360              NDI 360
02 362 376 360              CPI 360
02 364 312 013 103          JTZ TICK4
02 367 062 027 377          STA 027 "377
02 372 000                  NOP
02 373 311          CKDN,   RET
                    /
02 374 366 000      TICK1,  ORI 000          / EQUAL TIME BRANCH
02 376 303 324 102          JMP CHKP2
03 001 366 000      TICK2,  ORI 000
03 003 303 341 102          JMP CHKP3
03 006 366 000      TICK3,  ORI 000
03 010 303 356 102          JMP CHKP4
03 013 366 000      TICK4,  ORI 000
03 015 303 373 102          JMP CKDN
                    /
                            PAGE
                    / RNDGTN SIMULATES A PUSHBUTTON INPUT USING
                    / A RANDOM NUMBER GENERATOR.
                    / ALL FOUR PLAYERS ARE UPDATED, ALTHOUGH ONLY ONE
                    / AT A TIME IS ACTUALLY NEEDED.
                    /
03 020 072 010 377  RNDGT,  LDA 010 "377     / GET P1 DIREC
03 023 107                  LB A
03 024 315 151 103          CAL RND
03 027 315 176 103          CAL BIAS
03 032 200                  AD B
03 033 107                  LB A
03 034 052 000 377          LDHL 000 "377    / P1 POSITION
03 037 315 211 103          CAL LEGAL
03 042 170                  LA B
03 043 062 010 377          STA 010 ",377    / UPDATE P1 DIREC 03 046 072 011 377          LDA 011 "377     / NOW P2
03 051 107                  LB A
```

APPENDIX II   FOUR-PLAYER GAME -Continued

```
03 052 315 151 103        CAL RND
03 055 315 176 103        CAL BIAS
03 060 200                AD B
03 061 107                LB A
03 062 052 002 377        LDHL 002 "377
03 065 315 211 103        CAL LEGAL
03 070 170                LA B
03 071 062 011 377        STA 011 "377

03 074 072 012 377        LDA 012 "377    / NOW P3
03 077 107                LB A
03 100 315 151 103        CAL RND
03 103 315 176 103        CAL BIAS
03 106 200                AD B
03 107 107                LB A
03 110 052 004 377        LDHL 004 "377
03 113 315 211 103        CAL LEGAL
03 116 170                LA B
03 117 062 012 377        STA 012 "377

03 122 072 013 377        LDA 013 "377    / NOW P4
03 125 107                LB A
03 126 315 151 103        CAL RND
03 131 315 176 103        CAL BIAS
03 134 200                AD B
03 135 107                LB A
03 136 052 006 377        LDHL 006 "377
03 141 315 211 103        CAL LEGAL
03 144 170                LA B
03 145 062 013 377        STA 013 "377
03 150 311                RET
                /
                          PAGE
                / RANDOM NUMBER GENERATOR
                /
                /
03 151 345        RND,    PSHX HL
03 152 052 015 377        LDHL 015 "377   / GET RND POLY
03 155 175                LA L
03 156 037                RAR
03 157 037                RAR
03 160 037                RAR
03 161 254                XR H
03 162 027                RAL
03 163 174                LA H
03 164 037                RAR
03 165 147                LH A
03 166 175                LA L
03 167 037                RAR
03 170 157                LL A
03 171 042 015 377        STHL 015 "377
03 174 341                POPX HL
03 175 311                RET
03 176 346 077    BIAS,   NDI 077         / GO MOSTLY STRAIGHT
03 200 376 001            CPI 001
03 202 310                RTZ
03 203 376 003            CPI 003
03 205 310                RTZ
03 206 076 000            LAI 000
03 210 311                RET
                /
                          PAGE
                / LEGAL CHECKS THE DIREC. IN B (USING
                / COORD. IN H,L) FOR LEGAL MOVE IF OK
                / RETURNS WITH B UNCHANGED. IF NOT OK AND
                / THERE IS A POSSIBLE MOVE, RETURNS WITH B=
                / OK DIRECTION.
          {jR{jR{jR 315 266 103 LEGAL,  CAL TRYIT
03 214 376 006            CPI 006         / BLANK?
03 216 310                RTZ             / YES:OK MOVE
```

APPENDIX II FOUR-PLAYER GAME - Continued

```
03 217 315 151 103            CAL RND
03 222 376 200                CPI 200
03 224 372 233 103            JTS DECB
03 227 004                    INB
03 230 303 234 103            JMP TT
03 233 005          DECB,     DCB             / TURN
03 234 315 266 103 STT,       CAL TRYIT
03 237 376 006                CPI 006
03 241 310                    RTZ
03 242 005                    DCB
03 243 315 266 103            CAL TRYIT
03 246 376 006                CPI 006
03 250 310                    RTZ
03 251 005                    DCB
03 252 315 266 103            CAL TRYIT
03 255 376 006                CPI 006
03 257 310                    RTZ
03 260 005                    DCB
03 261 170                    LA B
03 262 346 003                NDI 003
03 264 107                    LB A
03 265 311                    RET
03 266 170          TRYIT,    LA B            / B=DIREC. TO TRY
03 267 346 003                NDI 003         / (UNMASKED)
03 271 107                    LB A
03 272 315 173 101            CAL DIREC
03 275 126                    LD M
03 276 315 303 103            CAL HLRES
03 301 172                    LA D
03 302 311                    RET
03 303 130          HLRES,    LE B            / PUT H,L BACK
03 304 170                    LA B            / PRESERVE B
03 305 306 002                ADI 002         / DO 180
03 307 346 003                NDI 003
03 311 107                    LB A
03 312 315 173 101            CAL DIREC
03 315 103                    LB E
03 316 311                    RET
                              PAGE
                    /    HIT IS CALLED WITH H,L POINTING TO COLLISION LOCATION
                    /
03 317 315 062 105 HIT,       CAL BOOM
03 322 136                    LE M            / SAVE COLLISION CHAR IN E
03 323 325          FLASH,    PSHX DE         / SAVE COLLISION CHAR (REG E)
03 324 345                    PSHX HL
03 325 021 000 000            LXI DE 000 000  / OUTER LOOP (FLASH INTERVAL)
03 330 041 000 000 INER,      LXI HL 000 000  / TIME BETW. FLASHES
03 333 043          DEL1,     INX HL
03 334 174                    LA H
03 335 376 020                CPI 020
03 337 302 333 103            JFZ DEL1
03 342 315 307 102            CAL PBCK
03 345 303 040 105            JMP FLSH
03 350 023          FLRET,    INX DE
03 351 173                    LA E
03 352 376 020                CPI 020
03 354 302 330 103            JFZ INER
03 357 341                    POPX HL         / DONE FLASHING - RESTORE COLLIS.
03 360 321                    POPX DE         / AND CRASH LOCATION
03 361 163                    LM E            / PUT COLLISION CHAR BACK
03 362 171                    LA C            / WHO HIT?
03 363 376 010                CPI 010         / P1?
03 365 314 114 105            CTZ HITP1       / YES - DECR P1 SCORE
03 370 376 014                CPI 014         / P2?
03 372 314 132 105            CTZ HITP2       / YES
03 375 376 020                CPI 020         / P3?
03 377 314 150 105            CTZ HITP3       /YES
04 002 376 024                CPI 024         / P4?
04 004 314 166 105            CTZ HITP4       /YES
04 007 173                    LA E            / WHAT WAS HIT?
04 010 346 370                NDI 370
04 012 376 050                CPI 050
```

APPENDIX II  FOUR-PLAYER GAME - Continued

```
04 014 314 103 104            CTZ P1HT
04 017 376 110                CPI 110
04 021 314 120 104            CTZ P2HT
04 024 376 150                CPI 150
04 026 314 135 104            CTZ P3HT
04 031 376 210                CPI 210
04 033 314 152 104            CTZ P4HT
04 036 315 044 106            CAL ERAD
04 041 072 031 377            LDA 031 ,377    / END OF GAME?
04 044 376 003                CPI 003
04 046 312 214 104            JTZ WINNER      / A<4
04 051 362 254 104            JFS NOWINR      / A=4
04 054 072 030 377            LDA 030 ,377    / CHECK B0 (031=377=0)
04 057 376 003                CPI 003
04 061 372 216 100            JTS PONE
04 064 072 031 377            LDA 031 ,377    / GET NO. OUT OF GAME
04 067 062 030 377            STA 030 ,377
04 072 315 217 106            CAL EPIDLY
04 075 315 114 101            CAL INIT2
04 100 303 177 10
            0                 JMP NEWRND
                        /
                              PAGE
04 103 171            P1HT,   LA C
04 104 376 010                CPI 010
04 106 310                    RTZ             / HIT SELF       ( LDA 032 377
04 107 072 002 377            LDA 002 ,377    ←                  CPI 001  )
04 114 310                    RTZ             / HIT DEAD ARROW
04 115 303 114 105            JMP HITP1       / RET FROM THERE
04 120 171            P2HT,   LA C
04 121 376 014                CPI 014
04 123 310                    RTZ
04 124 072 033 377            LDA 033 ,377
04 127 376 001                CPI 001
04 131 310                    RTZ
04 132 303 132 105            JMP HITP2
04 135 171            P3HT,   LA C
04 136 376 020                CPI 020
04 140 310                    RTZ
04 141 072 034 377            LDA 034 ,377
04 144 376 001                CPI 001
04 146 310                    RTZ
04 147 303 150 105            JMP HITP3
04 152 171            P4HT,   LA C
04 153 376 024                CPI 024
04 155 310                    RTZ
04 156 072 035 377            LDA 035 ,377
04 161 376 001                CPI 001
04 163 310                    RTZ
04 164 303 166 105            JMP HITP4
                        /
                        /
                        /
04 167 041 000 000   BIGDEL,  LXI HL 000,000
04 172 043           BGD,     INX HL
04 173 174                    LA H
04 174 376 377                CPI 377
04 176 310                    RTZ
04 177 303 172 104            JMP BGD
                        /
04 202 036 013       HUGDEL,  LEI 013
04 204 315 167 104   HDL,     CAL BIGDEL
04 207 035                    DCE
04 210 302 204 104            JFZ HDL
04 213 311                    RET
04 214 315 114 101   WINNER,  CAL INIT2       / CLEAR SCREEN
04 217 072 014 377            LDA 014 ,377
04 222 376 000                CPI 000
04 224 302 240 104            JFZ NEXTGM      / ADV. - NO BLINK
04 227 026 100                LDI 100
04 231 315 305 104   DELW,    CAL BLINK       / WINNING ARROW S
```

APPENDIX II  FOUR-PLAYER GAME  Continued

```
04 234 025                      DCD                / 64 TIMES
04 235 302 231 104              JFZ DELW
04 240 315 114 101  NEXTGM,     CAL INIT2
04 243 315 263 106              CAL MESGE
04 246 315 202 104              CAL HUGDEL
04 251 303 000 100              JMP ORIGIN
04 254 072 014 377  NOWINR,     LDA 014 "377
04 257 376 000                  CPI 000
04 261 302 240 104              JFZ NEXTGM
04 264 041 217 341              LXI HL 217 "341
04 267 066 024                  LMI 024            / N
04 271 054                      INL
04 272 066 025                  LMI 025            / O
04 274 315 362 104              CAL WINON          / WINNER
04 277 315 202 104              CAL HUGDEL
04 302 303 240 104              JMP NEXTGM
04 305 041 000 340  BLINK,      LXI HL 000 "340
04 310 176          LP2,        LA M
04 311 346 037                  NDI 037
04 313 376 010                  CPI 010
04 315 364 336 104              CFS TEST2          / A>7
04 320 043                      INX HL
04 321 174                      LA H
04 322 376 343                  CPI 343
04 324 302 310 104              JFZ LP2
04 327 175                      LA L
04 330 376 200                  CPI 200
04 332 302 310 104              JFZ LP2
04 335 311                      RET
04 336 376 015      TEST2,      CPI 015
04 340 360                      RFS                / A>14
04 341 376 014                  CPI 014            / BLINK
04 343 312 355 104              JTZ ARW            / FOUNK BLANK
04 346 137                      LE A               / FOUND ARROW:
04 347 066 014                  LMI 014            / PUT BLANK
04 351 315 362 104              CAL WINON
04 354 311                      RET
04 355 163          ARW,        LM E               / : PUT ARROW
04 356 315 011 105              CAL WINOFF
04 361 311                      RET
04 362 345          WINON,      PSHX HL
04 363 041 315 341              LXI HL 315 "341
04 366 066 032                  LMI 032            / W
04 370 054                      INL
04 371 066 022                  LMI 022            / I
04 373 054                      INL
04 374 066 024                  LMI 024            / N
04 376 054                      INL
04 377 066 024                  LMI 024            / N
05 001 054                      INL
05 002 066 017                  LMI 017            / E
05 004 054                      INL
05 005 066 027                  LMI 027            / R
05 007 341                      POPX HL
05 010 311                      RET 05 011 345          WINOFF,     PSHX HL
05 012 041 315 341              LI HL 315 "341
05 015 066 006                  LMI 006
05 017 054                      INL
05 020 066 006                  LMI 006
05 022 054                      INL
05 023 066 006                  LMI 006
05 025 054                      INL
05 026 066 006                  LMI 006
05 030 054                      INL
05 031 066 006                  LMI 006
05 033 054                      INL
05 034 066 006                  LMI 006
05 036 341                      POPX HL
05 037 311                      RET
```

APPENDIX II  FOUR-PLAYER GAME - Continued

```
05 040 343              FLSH,   SP<>HL              / GET BLOWUP COORD FROM STACK TOP
05 041 176                      LA M                / GET CHAR
05 042 376 006                  CPI 006             / BLANK?
05 044 312 054 105              JTZ BU              / YES: WRITE B-U CHAR
05 047 066 006                  LMI 006             / NO:  WRITE BLANK
05 051 303 056 105              JMP SCR
05 054 066 007          BU,     LMI 007             / BLOWUP CHAR
05 056 343              SCR,    SP<>HL
05 057 303 350 103              JMP FLRET
                        /
05 062 072 014 377      BOOM,   LDA 014 *377
05 065 346 001                  NDI 001             / GAME?
05 067 312 077 105              JTZ BM              / YES
05 072 333 001                  INP 001             / NO: CHECK SWITCH
05 074 346 004                  NDI 004             / BIT 2
05 076 310                      RTZ                 / NO BOOM
05 077 323 004          BM,     OUT 004
05 101 076 000                  LAI 000
05 103 074              BLD,    INA                 / 1 MSEC DELAY
05 104 376 200                  CPI 200
05 106 302 103 105              JFZ BLD
05 111 323 010                  OUT 010
05 113 311                      RET
                        /
05 114 076 001          HITP1,  LAI 001
05 116 062 020 377              STA 020 *377        / P1 ERADICATE FLAG
05 121 062 036 377              STA 036 *377        / P1 OUT OF ROUND LIST
05 124 315 024 106              CAL INHITF
05 127 303 204 105              JMP DCRP1
05 132 076 001          HITP2,  LAI 001
05 134 062 021 377              STA 021 *377
05 137 062 037 377              STA 037 *377
05 142 315 024 106              CAL INHITF
05 145 303 245 105              JMP DCRP2
05 150 076 001          HITP3,  LAI 001
05 152 062 022 377              STA 022 *377
05 155 062 040 377              STA 040 *377
05 160 315 024 106              CAL INHITF
05 163 303 314 105              JMP DCRP3
05 166 076 001          HITP4,  LAI 001
05 170 062 023 377              STA 023 *377
05 173 062 041 377              STA 041 *377
05 176 315 024 106              CAL INHITF
05 201 303 355 105              JMP DCRP4
05 204 345              DCRP1,  PSHX HL             / SAVE B.U. POSITION
05 205 041 015 340              LXI HL 015 *340
05 210 076 012                  LAI 012
05 212 276                      CP M                / ARROW?
05 213 312 241 105              JTZ DCR1            / YES
05 216 054                      INL                 / NO - GO TO NEXT POS
05 217 276                      CP M                / ARROW?
05 220 312 241 105              JTZ DCR1            / YES
05 223 054                      INL                 / NO - NEXT
05 224 276                      CP M                / ARROW?
05 225 312 241 105              JTZ DCR1            / YES
05 230 054                      INL                 / NO - THERE MUST BE AN ARROW HERE
05 231 076 001                  LAI 001             / IT*S ALL OVER FOR PLAYER 1
05 233 062 032 377              STA 032 *377
05 236 315 034 106              CAL INOUTF
05 241 066 004          DCR1,   LMI 004             / REPLACE WITH WALL
05 243 341                      POPX HL
05 244 311                      RET
                        /
                        /
05 245 345              DCRP2,  PSHX HL
05 246 041 177 341              LXI HL 177 *341
05 251 076 013                  LAI 013
05 253 276                      CP M
05 254 312 310 105              JTZ DCR2
05 257 041 237 341              LXI HL 237 *341
05 262 276                      CP M
05 263 312 310 105              JTZ DCR2
```

APPENDIX II  FOUR-PLAYER GAME - Continued

```
05 266 041 277 341              LXI HL 277 *341
05 271 276                      CP M
05 272 312 310 105              JTZ DCR2
                                        05 275 041 337 341      LXI HL 337 *341
05 300 076 001                  LAI 001           / BYE-BYE P2
05 302 062 033 377              STA 033 *377
05 305 315 034 106              CAL INOUTF
05 310 066 005       DCR2,      LMI 005
05 312 341                      POPX HL
05 313 311                      RET
05 314 345           DCRP3,     PSHX HL
05 315 041 156 343              LXI HL 156 *343
05 320 076 010                  LAI 010
05 322 276                      CP M
05 323 312 351 105              JTZ DCR3
05 326 054                      INL
05 327 276                      CP M
05 330 312 351 105              JTZ DCR3
05 333 054                      INL
05 334 276                      CP M
05 335 312 351 105              JTZ DCR3
05 340 054                      INL
05 341 076 001                  LAI 001
05 343 062 034 377              STA 034 *377
05 346 315 034 106              CAL INOUTF
05 351 066 004       DCR3,      LMI 004
05 353 341                      POPX HL
05 354 311                      RET
                     /
05 355 345           DCRP4,     PSHX HL
05 356 041 200 341              LXI HL 200 *341
05 361 076 011                  LAI 011
05 363 276                      CP M
05 364 312 020 106              JTZ DCR4
05 367 041 240 341              LXI HL 240 *341
05 372 276                      CP M
05 373 312 020 106              JTZ DCR4
05 376 041 300 341              LXI HL 300 *341
06 001 276                      CP M
06 002 312 020 106              JTZ DCR4
06 005 041 340 341              LXI HL 340 *341
06 010 076 001                  LAI 001
06 012 062 035 377              STA 035 *377
06 015 315 034 106              CAL INOUTF
06 020 066 005       DCR4,      LMI 005
06 022 341                      POPX HL
06 023 311                      RET
                     /
06 024 072 030 377   INHITF,    LDA 030 *377     / INCREMENT # PLYRS
06 027 074                      INA              / OUT OF ROUND
06 030 062 030 377              STA 030 *377
06 033 311                      RET
                     /
06 034 072 031 377   INOUTF,    LDA 031 *377     / INCREMENT # PLYRS OUT
06 037 074                      INA              / OF GAME
06 040 062 031 377              STA 031 *377
06 043 311                      RET
                     /   ERADICATE SUBROUTINE --
                     /   ENTERED W. COLLIS CHAR IN E, LOC. IN H,L
                     /   CHECKS THE ERADICATION LIST ON PAGE 377,
                     /   AND WIPES OUT APPROPRIATE PLAYER PATH(S).
                     /   IF IT FINDS A 0, DOES NOTHING.
                     /
06 044 173           ERAD,      LA E             / SAVE COLLIS. LOC.
06 045 376 014                  CPI 014
06 047 372 054 106              JTS CHK1         / A<14
06 052 066 006                  LMI 006          / PUT HOLE IN THE WALL
06 054 072 020 377   CHK1,      LDA 020 *377     / P1 ERAD FLAG
06 057 376 001                  CPI 001
06 061 314 115 106              CTZ ERADP1
06 064 072 021 377              LDA 021 *377     / P2
06 067 376 001                  CPI 001
```

APPENDIX II  FOUR-PLAYER GAME - Continued

```
06 071 314 127 106         CTZ ERADP2
06 074 072 022 377         LDA 022 ¬377        / P3
06 077 376 001             CPI 001
06 101 314 141 106         CTZ ERADP3
06 104 072 023 377         LDA 023 ¬377        / P4
06 107 376 001             CPI 001
06 111 314 153 106         CTZ ERADP4
06 114 311                 RET
                /
06 115 036 040    ERADP1,  LEI 040
06 117 076 000             LAI 000             / CLR ERAD FLAG
06 121 062 020 377         STA 020 ¬377
06 124 303 165 106         JMP WIPOUT
                /
06 127 036 100    ERADP2,  LEI 100
06 131 076 000             LAI 000
06 133 062 021 377         STA 021 ¬377
06 136 303 165 106         JMP WIPOUT
                /
06 141 036 140    ERADP3,  LEI 140
06 143 076 000             LAI 000
06 145 062 022 377         STA 022 ¬377
06 150 303 165 106         JMP WIPOUT
                /
06 153 036 200    ERADP4,  LEI 200
T06 155 076 000            LAI 000
06 157 062 023 377         STA 023 ¬377
06 162 303 165 106         JMP WIPOUT
                /
06 165 041 040 340 WIPOUT, LXI HL 040 ¬340  / START LOCATION
06 170 176        LP1,     LA M              / GE CHAR
06 171 346 340             NDI 340           / 11100000
06 173 273                 CP E              / CORRECT PLAYER?
06 174 302 201 106         JFZ NX            / NO - GO TO NEXT POS.
06 177 066 006             LMI 006
06 201 043        NX,      INX HL
06 202 174                 LA H
06 203 376 343             CPI 343
06 205 302 170 106         JFZ LP1
06 210 175                 LA L
06 211 376 140             CPI 140
06 213 302 170 106         JFZ LP1
06 216 311                 RET
                /
                           PAGE
                /
06 217 345        EPIDLY,  PSHX HL
06 220 325                 PSHX DE
06 221 041 000 000         LXI HL 000 ¬000
06 224 021 000 000         LXI DE 000 ¬000
06 227 043        INR,     INX HL
06 230 174                 LA H
06 231 376 377             CPI 377
06 233 302 227 106         JFZ INR
06 236 023                 INX DE
06 237 172                 LA D
06 240 376 004             CPI 004
06 242 302 227 106         JFZ INR
06 245 321                 POPX DE
06 246 341                 POPX HL
06 247 311                 RET
06 250 353        MES,     DE<>HL            / CALL WITH H,L=SCREEN LOC,
06 251 176                 LA M              / D,E=MESGE LOCATION
06 252 267                 OR A
06 253 310                 RTZ
06 254 353                 DE<>HL
06 255 167                 LM A
06 256 023                 INX DE
06 257 043                 INX HL
06 260 303 250 106         JMP MES
                /
06 263 345        MESGE,   PSHX HL
```

APPENDIX II  FOUR-PLAYER GAME - Continued

```
06 264 325                    PSHX DE
06 265 041 115 341            LXI  HL 115 *341
06 270 021 334 106            LXI  DE MES1
06 273 315 250 106            CAL  MES
06 276 041 207 341            LXI  HL 207 *341
06 301 021 343 106            LXI  DE MES2
06 304 315 250 106            CAL  MES
06 307 041 307 341            LXI  HL 307 *341
06 312 021 365 106            LXI  DE MES3
06 315 315 250 106            CAL  MES
06 320 041 010 342            LXI  HL 010 *342
06 323 021 007 107            LXI  DE MES4
06 326 315 250 106            CAL  MES
06 331 321                    POPX DE
06 332 341                    POPX HL
06 333 311                    RET
                        /
                              PAGE
06 334 022        MES1,       #022           / INSERT
06 335 024                    #024
06 336 030                    #030
06 337 017                    #017
06 340 027                    #027
06 341 031                    #031
06 342 000                    #000
06 343 034        MES2,       #034           / 25 CENTS FOR 2 PLAYERS
06 344 036                    #036
06 345 037                    #037
06 346 006                    #006
06 347 020                    #020
06 350 025                    #025
06 351 027                    #027
06 352 006                    #006
06 353 034                    #034
06 354 006                    #006
06 355 026                    #026
06 356 023                    #023
06 357 015                    #015
06 360 033                    #033
06 361 017                    #017
06 362 027                    #027
06 363 030                    #030
06 364 000                    #000
06 365 036        MES3,       #036           / 50 CENTS FOR 4 PLAYERS
06 366 025                    #025
06 367 037                    #037
06 370 006                    #006
06 371 020                    #020
06 372 025                    #025
06 373 027                    #027
06 374 006                    #006
06 375 035                    #035
06 376 006                    #006
06 377 026                    #026
07 000 023                    #023
07 001 015                    #015
07 002 033                    #033
07 003 017                    #017
07 004 027                    #027
07 005 030                    #030
07 006 000                    #000
07 007 031        MES4,       #031           / THEN PRESS START
07 010 021                    #021
07 011 017                    #017
07 012 024                    #024
07 013 006                    #006
07 014 026                    #026
07 015 027                    #027
07 016 017                    #017
07 017 030                    #030
07 020 030                    #030
07 021 006                    #006
```

APPENDIX II  FOUR-PLAYER GAME -Continued

```
07 022 030                         #030
07 023 031                         #031
07 024 015                         #015
07 025 027                         #027
07 026 031                         #031
07 027 000                         #000
                         /    DRAW BOUNDARIES
                         /
07 030 041 000 340   D L L0 3  RSRN
                                306006   D, L 0          / BLK CHR.
07 035 043                         INX HL
07 036 174                         LA H
07 037 376 343                     CPI 343
07 041 302 033 107                 JFZ BDY1
07 044 175                         LA L
07 045 376 200                     CPI 200
07 047 302 033 107                 JFZ BDY1
07 052 041 000 340                 LXI HL 000 ⋈340
07 055 066 004       TOPMG,        LMI 004              / TOP BDY
07 057 054                         INL
07 060 175                         LA L
07 061 376 040                     CPI 040
07 063 302 055 107                 JFZ TOPMG
07 066 041 140 343                 LXI HL 140 ⋈343
07 071 066 004       BOTMG,        LMI 004
07 073 054                         INL
07 074 175                         LA L
07 075 376 200                     CPI 200
07 077 302 071 107                 JFZ BOTMG
07 102 041 000 340                 LXI HL 000 ⋈340
07 105 066 005       LFTMG,        LMI 005
07 107 021 040 000                 LXI DE 040 ⋈000
07 112 031                         DADX DE
07 113 174                         LA H
07 114 376 344                     CPI 344
07 116 302 105 107                 JFZ LFTMG
07 121 041 037 340                 LXI HL 037 ⋈340
07 124 066 005       RTMG,         LMI 005
07 126 031                         DADX DE
07 127 174                         LA H
07 130 376 344                     CPI 344
07 132 302 124 107                 JFZ RTMG
07 135 041 000 340                 LXI HL 000 ⋈340
07 140 066 000                     LMI 000              / UPPER LEFT CORNER
07 142 041 037 340                 LXI HL 037 ⋈340
07 145 066 001                     LMI 001              / UPPER RIGHT CORNER
07 147 041 140 343                 LXI HL 140 ⋈343
07 152 066 002                     LMI 002              / LOWER LEFT CORNER
07 154 041 177 343                 LXI HL 177 ⋈343
07 157 066 003                     LMI 003              / LOWER RIGHT CORNER
                                   PAGE
                         /
07 161 041 015 340                 LXI HL 015 ⋈340  / P1 SCORE POSITION
07 164 066 012                     LMI 012
07 166 054                         INL
07 167 066 012                     LMI 012
07 171 054                         INL
07 172 066 012                     LMI 012
07 174 054                         INL
07 175 066 036                     LMI 036
07 177 066 012                     LMI 012
07 201 041 177 341                 LXI HL 177 ⋈341  / P2 SCORE POSITION
07 204 066 013                     LMI 013
07 206 031                         DADX DE
07 207 066 013                     LMI 013
07 211 031                         DADX DE
07 212 066 013                     LMI 013
07 214 031                         DADX DE
07 215 066 013                     LMI 013
                         /
07 217 041 156 343                 LXI HL 156 ⋈343 / P3
07 222 066 010                     LMI 010
```

APPENDIX II  FOUR-PLAYER GAME - Continued

```
07 224 054                    INL
07 225 066 010                LMI 010
07 227 054                    INL
07 230 066 010                LMI 010
07 232 054                    INL
07 233 066 010                LMI 010
                           /
07 235 041 200 341            LXI HL 200 ⊬341    / P4
07 240 066 011                LMI 011
07 242 031                    DADX DE
07 243 066 011                LMI 011
07 245 031                    DADX DE
07 246 066 011                LMI 011
07 250 031                    DADX DE
07 251 066 011                LMI 011
07 253 311                    RET
07 254 005         TABLE,     #005       / UP-UP
07 255 000                    #000       / UP-RT
07 256 012                    012        / UP-DN
07 257 001                    #001       / UP-LFT
07 260 003                    #003       / RT-UP
07 261 004                    #004       / RT-RT
07 262 001                    #001       / RT-DN
07 263 013                    #013       / RT-LFT
07 264 010                    #010       / DN-UP
07 265 002                    #002       / DN-RT
07 266 005                    #005       / DN-DN
07 267 003                    #003       / DN-LFT
07 270 002                    #002       / LFT-UP
07 271 011                    #011       / LFT-RT
07 272 000                    #000       / LFT-DN
07 273 004                    #004       / LFT-LFT
ORIGIN 0 000 000 100
ST1    0 000 011 100
COINHR 0 000 071 100
ZPLSET 0 000 116 100
STARTC 0 000 153 100
NEWRND 0 000 177 100
NWR    0 000 205 100
PONE   0 000 216 100
PTWO   0 000 244 100
PTHR   0 000 272 100
PFOR   0 000 320 100
JUMPER 0 000 351 100
INIT   0 000 373 100
INIT2  0 000 114 101
LINE   0 000 117 101
NOTYET 0 000 144 101
B1UP   0 000 151 101
B1DN   0 000 160 101
B1RT   0 000 167 101
B1LFT  0 000 171 101
DIREC  0 000 173 101
DCOIN  0 000 216 101
MOVE   0 000 227 101
EXIT   0 000 275 101
WHICHP 0 000 300 101
BP4    0 000 320 101
BP3    0 000 324 101
BP2    0 000 330 101
BP1    0 000 334 101
P1MOVE 0 000 340 101
P2MOVE 0 000 376 101
P3MOVE 0 000 034 102
P4MOVE 0 000 072 102
BIN    0 000 130 102
LP     0 000 133 102
OUTGO  0 000 143 102
DELAY1 0 000 151 102
D1     0 000 174 102
ADVDEL 0 000 264 102
```

APPENDIX II    FOUR-PLAYER GAME - Continued

```
D2      0 000 267 102
OFF     0 000 302 102
PBCK    0 000 307 102
CHKP2   0 000 324 102
CHKP3   0 000 341 102
CHKP4   0 000 356 102
CKDN    0 000 373 102
TICK1   0 000 374 102
TICK2   0 000 001 103
TICK3   0 000 006 103
TICK4   0 000 013 103
RNDGT   0 000 020 103
RND     0 000 151 103
BIAS    0 000 176 103
LEGAL   0 000 211 103
DECB    0 000 233 103
STT     0 000 234 103
TRYIT   0 000 266 103
HLRES   0 000 303 103
HIT     0 000 317 103
FLASH   0 000 323 103
INER    0 000 330 103
DEL1    0 000 333 103
FLRET   0 000 350 103
P1HT    0 000 103 104
P2HT    0 000 120 104
P3HT    0 000 135 104
P4HT    0 000 152 104
BIGDEL  0 000 167 104
BGD     0 000 172 104
HUGDEL  0 000 202 104
HDL     0 000 204 104
WINNER  0 000 214 104
DELW    0 000 231 104
NEXTGM  0 000 240 104
NOWINR  0 000 254 104
BLINK   0 000 305 104
LP2     0 000 310 104
TEST2   0 000 336 104
ARW     0 000 355 104
WINON   0 000 362 104
WINOFF  0 000 011 105
FLSH    0 000 040 105
BU      0 000 054 105
SCR     0 000 056 105
BOOM    0 000 062 105
BM      0 000 077 105
BLD     0 000 103 105
HITP1   0 000 114 105
HITP2   0 000 132 105
HITP3   0 000 150 105
HITP4   0 000 166 105
DCRP1   0 000 204 105
DCR1    0 000 241 105
DCRP2   0 000 245 105
DCR2    0 000 310 105
DCRP3   0 000 314 105
DCR3    0 000 351 105
DCRP4   0 000 355 105
DCR4    0 000 020 106
INHITF  0 000 024 106
INOUTF  0 000 034 106
ERAD    0 000 044 106
CHK1    0 000 054 106
ERADP1  0 000 115 106
ERADP2  0 000 127 106
ERADP3  0 000 141 106
ERADP4  0 000 153 106
WIPOUT  0 000 165 106
LP1     0 000 170 106
NX      0 000 201 106
EPIDLY  0 000 217 106
```

APPENDIX II  FOUR-PLAYER GAME - Continued

```
INR     0  000  227  106
MES     0  000  250  106
MESGE   0  000  263  106
MES1    0  000  334  106
MES2    0  000  343  106
MES3    0  000  365  106
MES4    0  000  007  107
BDY     0  000  030  107
BDY1    0  000  033  107
TOPMG   0  000  055  107
BOTMG   0  000  071  107
LFTMG   0  000  105  107
RTMG    0  000  124  107
TABLE   0  000  254  107
```

What is claimed is:

1. A controllable game comprising: display means for producing a plurality of visual images on a display field; means for moving said images at a predetermined rate; input means for individually selecting the direction of movement of each moving visual image along any one of a plurality of different paths on said display field; and means controlling the display means for visibly displaying on said field a visual image of the path traversed by each of the moving images, the moving images of the traversed paths creating a visible barrier trail, said means for moving said images providing continued movement along the corresponding path until the next direction is selected by the input means whereupon continued movement is commenced along the corresponding path.

2. Apparatus of claim 1 wherein said means moving the images at a predetermined rate includes means for moving the images in incremental steps in succession, and further including means for creating a different audible indication at the time of incremental movement of each moving image.

3. A plural user controllable game comprising: display means; plural input means, one for each different user, for selectively controlling the direction for movement of a different image along any one of a plurality of different paths on said display means; means for simultaneously and visibly displaying on said display means, for each of said users, a player image; means moving each of said player images continuously along its own series of connected paths creating and leaving, behind the player, along its own paths, a visual barrier trail, said means for displaying responding to each of a provided series of said directions by any one of said input means for continued movement of the player image associated with the respective input means along the same path until the next direction in such series whereupon continued movement is commenced by the player along the path corresponding to such next direction; means for detecting when any one of said player images on the display encounters a barrier trail along its path of movement; and means for interrupting further movement of the one of said player images encountering a barrier trail.

4. Apparatus of claim 3 wherein said means moving each of said player images advances the images in incremental steps, and further including means for creating an audible indication at the time of each incremental step of movement for each of said player images which is different for each player image.

5. An electrical game apparatus comprising: means generating a plurality of moving visual images on a display field moving at predetermined rate, including means retaining a visual image of the paths traversed by said moving images, control means for instantaneously changing the direction of movement of any of said moving images on the display field, and means interrupting the movement of any one of the moving images when the moving image intercepts the retained image of any of said paths traversed by the moving images.

6. The apparatus of claim 5 in which the control means includes means for manually changing the direction of each moving image individually.

7. The apparatus of claim 6 further including means for initially positioning each of the moving images at predetermined spaced apart positions on the display field.

8. The apparatus of claim 5 wherein said means generating a plurality of moving images includes means advancing each of said images in incremental steps in any one of a plurality of predetermined directions on the display field, said control means including means for manually selecting with each incremental step any one of said predetermined directions.

9. The apparatus of claim 8 wherein said means moving each of the images in incremental steps includes means advancing each of said moving images in sequence.

10. The apparatus of claim 9 wherein each of said moving images continues to advance in the same direction on successive steps until a new direction is selected by said control means.

11. Apparatus of claim 10 wherein the number of moving images is initially greater than two.

12. Apparatus of claim 11 further including means removing any of the moving images from the display field when the image intercepts the retained images of any of said path traversed by the moving image.

13. Apparatus of claim 12 further including delay means interrupting the movement of the remaining images for a predetermined time and continuing said movement at the end of said delay time.

14. Apparatus of claim 13 further including means controlling the time interval between incremental moves of each of the images in sequence such that the time interval between incremental moves of one of said images is proportional to the number of images remaining on the display.

15. Apparatus of claim 12 further including means responsive to the interruption of a moving image with the retained image of the path traversed by another of said moving images for removing a portion of the intercepted retained image at the point of interception, whereby a hole is formed in the retained image of the traversed path.

16. Apparatus of claim 8 further including means interrupting the movement of a moving image in response to a reversal of the direction of movement of said image back along its own path by said control means.

17. An electronic game in which players control the types and locations of symbols on a visual display comprising means including a cathode ray tube and a sweep control for producing visual images in response to video signals by sweeping a plurality of horizontal lines during each vertical sweep, a random access memory, a central processor including means for reading or writing data in the memory, a second memory storing video signals corresponding to individual line segments of a plurality of different display symbols, means synchronized with the sweep control for addressing and reading out symbol identifying data from successive address locations in the random access memory to the second memory, the data from the random access memory addressing and reading out selected video signals from the second memory to the cathode ray tube for displaying the symbols identified by said identifying data, each address location in the random access memory storing in addition to the symbol identifying data, data identifying the player associated with a symbol, the player identifying data being accessible only to the central processor, means synchronized with the sweep control of the cathode ray tube for limiting access of the random access memory by the central processor to the interval between successive vertical scans, manually operated output control means for each player for generating signals identifying a change in position of a symbol on the display, the central processor including means for storing a predetermined symbol in any one of a plurality of address locations in the random access memory in response to said input control means, the central processor further including means for reading out the data stored in a selected location in the random access memory before storing a symbol in said location in response to said input control means, means generating an alarm signal when the symbol data read out of said location indicates the location is already storing a predetermined symbol, and means responsive to an alarm signal for removing all symbol data from the random access memory relating to the player whose move initiated the alarm signal.

18. An electronic game controlled by two or more players comprising:
means for visually displaying any one of a plurality of different types of symbols at a plurality of display locations arranged in a two-dimensional display matrix including memory means for storing symbol data for each location in the matrix, and means responsive to the data stored in the memory means for controlling the type of symbol displayed in the associated locations in the display matrix, means storing in the memory means symbol data for displaying a predetermined symbol for each player at a corresponding number of locations in the matrix display, player moving means for periodically storing new symbol data in the memory for each player in sequence, each new symbol data added to memory for each player being displayed in a location contiguous to the previous player symbol location on the display matrix, and means selecting the direction of the contiguous location relative to the prior location including means storing data indicating a current direction for each player, and a plurality of player-operated input controls for selectively changing the current direction data in said last-named storing means to indicate a different direction for any of the players, whereby a succession of symbols are displayed on the display matrix for each player which are periodically added to the display in contiguous locations in one direction until a new direction is signalled by the player through the input controls.

19. Apparatus of claim 18 wherein the player moving means further includes means for reading out the symbol data in the memory means associated with each newly selected contiguous location on the display matrix, and means signalling an illegal player move condition when the data read out of the memory means indicates a predetermined symbol already occupies that location on the display matrix.

20. Apparatus of claim 19 further including means responsive to the illegal move signalling means for erasing the symbol data in the memory means relating to the player attempting the illegal move.

21. Apparatus of claim 18 where the player moving means includes means responsive to said means storing data indicating direction for storing different symbol data for each player depending on the current direction data, so that each new symbol displayed for a player visually indicates current direction of the associated player is moving.

22. An electronic game controlled by two or more players comprising means for visually displaying any one of a plurality of different symbols at a plurality of display locations arranged in a two-dimensional display matrix, said display means including an addressable read-write memory for storing digitally coded data in a plurality of separately addressable storage locations, there being one storage location for each symbol display location in the matrix, and means responsive to the data stored in each of said address locations for controlling the type of symbol displayed in the corresponding location of the matrix; means initially storing player symbol data in at least two starting address locations in the storage means; player moving means for periodically storing player symbol data for each of the players in sequence at a predetermined rate in new address locations corresponding to the next adjacent locations on the display matrix; player-operated input control means for each player for selecting any one of the four directions of movement of the respective player symbols; means responsive to said input control means for changing the new address location corresponding to the next adjacent location on the display matrix in a new direction signaled by the input control means, the player moving means for reading out data stored in the selected new address location before storing the player symbol data in the new location; means interrupting the player moving means and signalling an illegal move if the data read out of the new location corresponds to a predetermined symbol; and means responsive to said interrupting means for clearing all address locations in memory storing symbol data associated with the player whose move initiated the signalling of an illegal move.

23. Apparatus of claim 22 wherein said interrupting means further includes means reactivating the player moving means after a predetermined delay for continuing the writing of new player symbols in the memory for the remaining players in the game.

24. Apparatus of claim 22 wherein the player moving means stores new player symbol data in the memory for each of the players remaining in a game in repetitive sequence, the time intervals being constant, whereby the total time interval between writing new symbol data in memory for each player is proportional to the number of players in the game.

* * * * *